(12) United States Patent
Minamitaka

(10) Patent No.: US 8,946,533 B2
(45) Date of Patent: Feb. 3, 2015

(54) MUSICAL PERFORMANCE TRAINING DEVICE, MUSICAL PERFORMANCE TRAINING METHOD AND STORAGE MEDIUM

(71) Applicant: Casio Computer Co., Ltd., Tokyo (JP)

(72) Inventor: Junichi Minamitaka, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 180 days.

(21) Appl. No.: 13/630,923

(22) Filed: Sep. 28, 2012

(65) Prior Publication Data

US 2013/0081531 A1 Apr. 4, 2013

(30) Foreign Application Priority Data

Sep. 29, 2011 (JP) ................. 2011-214216

(51) Int. Cl.
*A63H 5/00* (2006.01)
*G09B 15/00* (2006.01)
*G10H 1/00* (2006.01)
*G09B 5/06* (2006.01)

(52) U.S. Cl.
CPC .............. *G09B 15/00* (2013.01); *G10H 1/00* (2013.01); *G09B 5/06* (2013.01); *G10H 1/0016* (2013.01); *G10H 2210/091* (2013.01)
USPC ........................................................ 84/609

(58) Field of Classification Search
CPC ............. G10H 1/00; G09B 5/06; G09B 15/00
USPC ........................................................ 84/609
See application file for complete search history.

(56) References Cited

U.S. PATENT DOCUMENTS

| | | | |
|---|---|---|---|
| 2002/0040633 A1* | 4/2002 | Miyaki et al. | 84/477 R |
| 2004/0221707 A1* | 11/2004 | Hiratsuka et al. | 84/478 |
| 2006/0090626 A1* | 5/2006 | Harrison | 84/47 |
| 2008/0098061 A1* | 4/2008 | Zheng et al. | 709/202 |
| 2012/0270188 A1* | 10/2012 | Dalton | 434/178 |
| 2014/0100010 A1* | 4/2014 | Lee et al. | 463/7 |

FOREIGN PATENT DOCUMENTS

| | | |
|---|---|---|
| JP | 2007178697 A | 7/2007 |
| JP | 2010256796 A | 11/2010 |
| JP | 2011-053579 A | 3/2011 |

OTHER PUBLICATIONS

Chinese Office Action dated May 6, 2014 issued in counterpart Chinese Application No. 201210371789.2.
Japanese Office Action dated Aug. 8, 2013 issued in counterpart Japanese Application No. 2011-214216.

* cited by examiner

*Primary Examiner* — Jianchun Qin
(74) *Attorney, Agent, or Firm* — Holtz, Holtz, Goodman & Chick PC

(57) ABSTRACT

In the present invention, a CPU acquires an achievement level based on the difficulty level of a song by evaluating the playing skills of the user based on a comparison of a plurality musical notation data expressing each note composing the song and music playing data generated in response to the song being played and inputted by the user; updates state variables (achievement level rank "achieve" and achievement level rank change "change") in a value function table "value" based on the acquired achievement level; and gives advice of a type specified by the most effective (maximum value) advice type "action" retrieved from the value function table "value" [achieve][change][action] based on the updated state variables to the user playing and inputting the song.

8 Claims, 17 Drawing Sheets

MUSICAL PERFORMANCE TRAINING DEVICE, MUSICAL PERFORMANCE TRAINING METHOD AND STORAGE MEDIUM

CROSS-REFERENCE TO RELATED APPLICATION

This application is based upon and claims the benefit of priority from the prior Japanese Patent Application No 2011-214216, filed Sep. 29, 2011, the entire contents of which is incorporated herein by reference.

BACKGROUND OF THE INVENTION

1. Field of the Invention

The present invention relates to a musical performance training device, a musical performance training method, and a storage medium suitable for use in an electronic musical instrument.

2. Description of the Related Art

A musical performance training device is known that enhances the effects of practice based on the evaluation result of the user's (instrument player's) musical performance. As this type of technology, for example, Japanese Patent Application Laid-open (Kokai) Publication. No. 2011-053579 discloses a technology by which whether or not there are misplayed notes is judged based on a comparison between music playing data created by the playing and inputting of music and musical notation data corresponding to a model performance. When there are misplayed notes, they are each classified into a corresponding musical performance mistake field and tallied, whereby an often misplayed note is extracted. Then, if this note is misplayed again, the user is made to repeatedly practice this often misplayed note to correct the tendency to misplay it.

However, all this technology does is to make the user repeatedly practice an often misplayed note when the same mistake is repeated. Accordingly, the technology disclosed in Japanese Patent Application Laid-open (Kokai) Publication No. 2011-053579 has a problem in that optimal advice based on a user state cannot be given.

The present invention has been conceived in light of the above-described problem. An object of the present invention is to provide a musical performance training device, a musical performance training method, and a storage medium by which optimal advice based on a user state is given.

SUMMARY OF THE INVENTION

In order to achieve the above-described object, accordance with one aspect of the present invention, there is provided a musical performance training device comprising: an advice generating section which generates advice; an acquiring section which acquires an achievement level of music performance based on music playing data acquired by a predetermined song being played, after the advice generating section generates the advice; a calculating section which calculates an achievement level change amount based on the achievement level acquired by the acquiring section and a previously acquired achievement level acquired before the achievement level; a storage control section which stores in a predetermined memory a data group where the previously acquired achievement level, the achievement level change amount and the advice are formed into a single group; and an advice control section which selects advice data included in a data group having an achievement level closest to the achievement level acquired by the acquiring section and a greatest achievement level change amount from plural groups of data stored in the memory, and controls the advice generating section to generate advice based on the advice data.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will hereinafter be described with reference to the drawings.

First Embodiment

A. Structure

Figure 1:
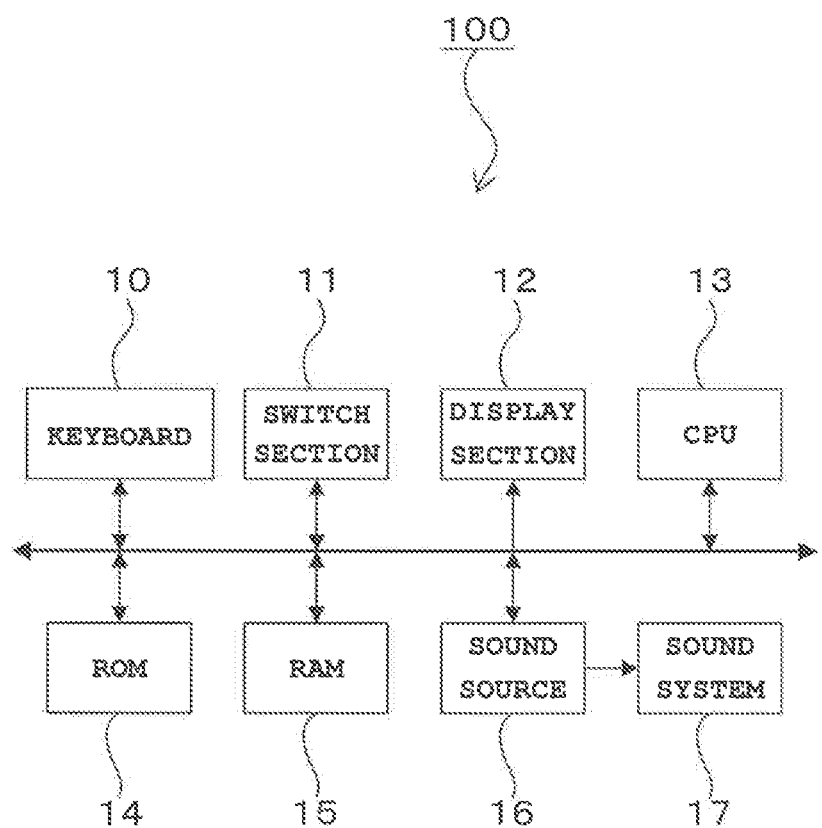
FIG. 1 is a block diagram showing the overall structure of a musical performance training device 100 according to a first embodiment.

FIG. 1 is a block diagram showing the overall structure of a musical performance training device 100 according to a first embodiment. A keyboard 10 in FIG. 1 generates musical performance information including a key-ON/key-OFF event, a key number, velocity, and the like based on the playing and inputting of music (key depression and release operation). A switch section 11 of FIG. 1 has various operation switches arranged on a device panel, and generates a switch event corresponding to the type of a switch operated by the user. The main switches provided in the switch section 11 are, for example, a power supply switch for turning ON and OFF the power, a song selection switch for selecting song data that serves as a model (model performance) and an end switch for giving an instruction to end operation.

A display section 12 in FIG. 1 includes a liquid crystal display (LCD) panel or the like, and displays the musical score of song data to be played and inputted, musical performance evaluation results generated when a musical performance is completed, and the operational status and the setting status of the musical performance training device 100, based on display control signals supplied from a central processing unit (CPU) 13.

The CPU 13 converts playing information, which is generated by the keyboard 10 in response to the playing and inputting of music, into musical instrument digital interface (MIDI)-format music playing data (such as note-ON/note-OFF), and stores the music playing data while giving an instruction to produce musical sound by supplying the music playing data to a sound source 16. Also, the CPU 13 evaluates the playing skills of the user based on a comparison of stored music playing data and musical notation data constituting song data serving as a model (model performance), and after acquiring an achievement level that takes into account the difficulty level of the song, gives the most effective advice for improving the acquired achievement level to the user. The characteristic processing operations of the CPU 13 related to the scope of the present invention will be described later in detail.

A read-only memory (ROM) 14 in FIG. 1 stores various control programs to be loaded into the CPU 13. These various control programs are used for corresponding point identification processing, musical performance judgment processing, achievement level calculation processing, variable update processing, advice processing, and the like constituting the main routine described hereafter. Note that the corresponding point identification processing includes distance calculation processing and dynamic programming (DP) matching processing, and the variable update processing includes maximum Q action processing.

A random access memory (RAM) 15 of FIG. 1 includes a work area, a music playing data area, and a song data area. The work area of the RAM 15 temporarily stores various register and flag data that are used by the CPU 13 for processing. This area includes a difficulty level table iFTCost in which difficulty levels are registered in association with the types of musical performance techniques, and a value function table "value" generated based on the Q—learning theory. The purposes of the difficulty level table iFTCost and the value function table "value" will be described later.

The music playing data area of the RAM 15 stores a plurality of music playing data of music playing sounds generated by the CPU 13 in response to the playing and inputting of music. The song data area of the RAM 15 stores song data serving as a model (model performance) for a plurality of songs. This song data is composed of musical notation data expressing a plurality of musical notes forming a song, which is divided into a right-hand part to be played by the right hand, a left-hand part to be played by the left hand, and a left-hand and right-hand part to be played by both hands.

A single piece of musical notation data is composed of iTime, iGate, iPit, iVel, iTech, and iClear, of which iTime indicates sound-generation time, iGate indicates sound length, iPit indicates pitch, and iVel indicates velocity (sound volume), iTech is a value expressing the type of musical performance technique. The type of musical performance technique herein refers to the type of finger movement, such as "cross-over" and "pass-under" Negative values indicate that the note does not require musical performance technique, and values zero or greater indicate the types of musical performance techniques. iTech is hereinafter referred to as musical performance technique type, iClear is a flag indicating whether or not the corresponding note has been correctly played following the model. "1" indicates that the note has been correctly played following the model, and "0" indicates that the note has not been correctly played, iClear is hereinafter referred to as a clear flag iClear.

The sound source 16 is configured by a known waveform memory readout system, and generates and outputs musical sound data based on music playing data supplied by the CPU 13. A sound system 17 in FIG. 1 converts musical sound data outputted from, the sound source 16 to analog-format musical sound signals, and after performing filtering to remove unwanted noise and the like from the musical sound signals amplifies the level, and emits the sound from a speaker.

B. Operations

Next, operations of the musical performance training device 100 structured as above will be described with reference to FIG. 2 to FIG. 9. Specifically, operations in the main routine, the corresponding point identification processing, the musical performance judgment processing, the achievement level calculation processing, the variable update processing, and the advice processing that are performed by the CPU 13 will hereinafter be described, respectively. Note that the corresponding point identification processing includes the distance calculation processing and the DP matching processing, and the variable update processing includes the maximum Q action processing.

(1) Operations in the Main Routine

Figure 2:
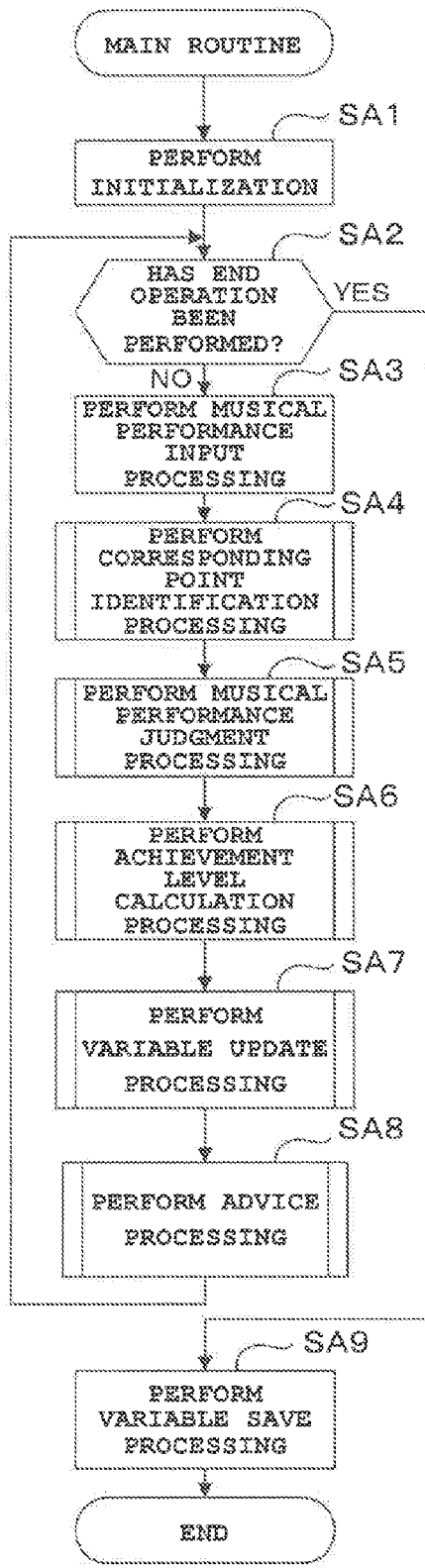
FIG. 2 is a flowchart of operations in the main routine.

FIG. 2 is a flowchart of operations in the main routine. When the musical performance training device 100 is turned ON, the CPU 13 runs the main routine shown in FIG. 2. First, the CPU 13 proceeds to Step SA1 and performs initialization to initialize each section of the musical performance training device 100. When the initialization is completed, the CPU 13 proceeds to Step SA2 and judges whether or not an end operation has been performed. When judged that an end operation has not been, the judgment result is "NO", and therefore the CPU 13 proceeds to Step SA3.

At Step SA3, the CPU 13 performs musical performance input processing for storing music playing data which has been generated by the CPU 13 in response to the playing and inputting of music in the music playing data area of the RAM 15. In the musical performance input processing, song data selected by the operation of the song selection switch is set as a practice piece, the music score of the song data is displayed on the display section 12, and the user plays and inputs each note of the song while viewing the music score.

Next, at Step SA4, the CPU 13 performs the corresponding point identification processing for identifying the musical notation data in the song data serving as a model (model performance) to which the music playing data generated by the song being played and inputted by the user corresponds, and determining whether the corresponding musical notation data is a right-hand part, a left-hand part, or a left-hand and right-hand part.

Next at Step SA5, the CPU 13 performs the musical performance judgment processing for judging whether or not the note of the musical notation data identified at above-described. Step SA4 has been correctly played by comparing the pitch iPit of the musical notation data with the pitch of the music playing data, and setting the clear flag iClear of the correctly played musical notation data to "1".

Next, at Step SA6, the CPU 13 performs the achievement level calculation processing. As described hereafter, in the achievement level calculation processing, the CPU 13 extracts the number of occurrences and the number of times cleared (the number of times musical notation data is correctly played) for each type of musical performance technique from the musical performance technique type iTech included in all musical notation data in the song data; calculates an achievement level for each type of musical performance technique by multiplying an accuracy rate (number of times cleared/number of occurrences) for each type of musical performance technique acquired from the extracted number of occurrences and the extracted number of times cleared by a difficulty level according to the type of musical performance technique; accumulates each calculated achievement level; and thereby acquires an achievement level achieveValue based on the difficulty level of the song.

Next at Step SA7, the CPU 13 performs the variable update processing for updating state variables in the value function table "value" based on the achievement level achieveValue acquired by the song being played and inputted in accordance with current advice, on the basis of the Q-learning theory, and acquiring the most effective advice from the value function table "value" based on the updated state variables. Next, at Step SA8, the CPU 13 provides the user playing and inputting the song with advice of a type specified by the most effective (maximum Q action value maxQ) advice type "action" retrieved from the value function table "value" [achieve][change][i].

Then, the CPU 13 returns to above-described Step SA2, and repeatedly performs Step SA2 to Step SA9 until an end operation is performed. When an end operation is performed, the judgment result at Step SA2 is "YES", and therefore the CPU 13 proceeds to Step SA9. At Step SA9, the CPU 13 performs variable save processing for saving the variables (previous achievement level rank prevAchieve, achievement level rank change prevChange, advice type prevAction, and achievement level pevAchieveValue) updated in the variable update processing (performed at Step SA7) and ends the main routine.

(2) Operations in the Corresponding Point Identification Processing

Figure 3:
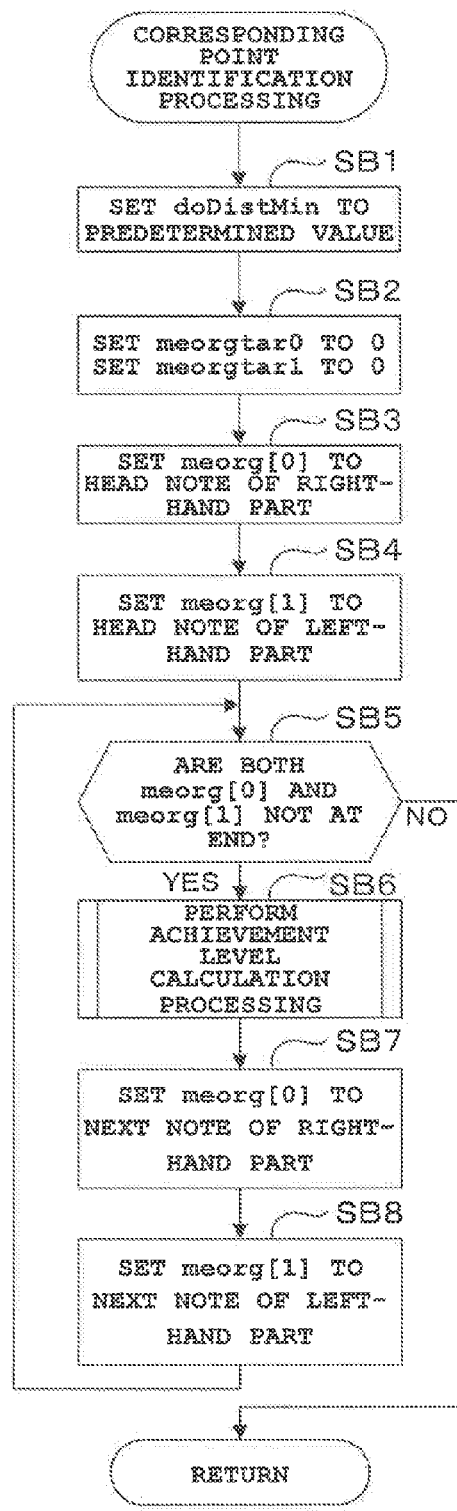
FIG. 3 is a flowchart of operations in corresponding point identification processing.

Next, operations in the corresponding point identification processing will be described with reference to FIG. 3. When the corresponding point identification processing is started at Step SA4 (see FIG. 2) of the main routine, the CPU 13 proceeds to Step SB1 shown in FIG. 3, and stores a predetermined value serving as an initial value in a register doDistMin. The purpose of the initial value stored in the register doDistMin will be described hereafter.

Next, at Step SB2, the CPU 13 resets a pointer meorgtar0 and a pointer meorgtar1 to "0". The pointer meorgtar0 herein is a pointer that specifies musical notation data corresponding to music playing data generated by the playing and inputting of music by the user from among the musical notation data of the right-hand part in the song data. Similarly, the pointer meorgtar1 is a pointer that specifies musical notation data corresponding to music playing data generated by the playing and inputting of music by the user from among the musical notation data of the left-hand part in the song data.

Next, at Step SB3 to Step SB4, the CPU 13 stores in a pointer meorg[0] an address value specifying a head note (note at the head of musical notation data) within the musical notation data of the right-hand part in the song data. In addition, the CPU 13 stores in a pointer meorg[1] an address value specifying a head note (note at the head of musical notation data) within the musical notation data of the left-hand part in the song data. The CPU 13 then proceeds to Step SB5 and judges whether or not both pointers meorg[0] and meorg[1] are at the end, or in other words, whether or not the search of a corresponding point has been performed to the end of the song.

When judged that the search of a corresponding point has not been performed to the end of the song, the judgment result at Step SB5 is "YES", and therefore the CPU 13 proceeds to Step SB6. At Step SB6 to Step SB8, until the end of the song is reached, the CPU 13 repeatedly performs the distance calculation processing of Step SB6 such that the processing is performed every time the pointers meorg[0] and meorg[1] are forwarded. Then, when judged that the search of a corresponding point has been performed to the end of the song, the judgment result at Step SB5 is "NO" and therefore the CPU 13 ends the corresponding point identification processing.

As described hereafter, in the distance calculation processing at Step SB6, the CPU 13 performs known DP matching on the music playing data generated by the playing and inputting of music by the user for all musical notation data (the right-hand part, the left-hand part, and the left-hand and right-hand part) in the song data; calculates a distance (a distance for the right-hand part, a distance for the left-hand part and a distance for the left-hand and right-hand part) equivalent to the degree of similarity; and identifies the musical notation data of a part that has the shortest distance among the calculated distances and therefore has the greatest degree of similarity, as a point corresponding to the music playing data.

(3) Operations in the Distance Calculation Processing

Figure 4:
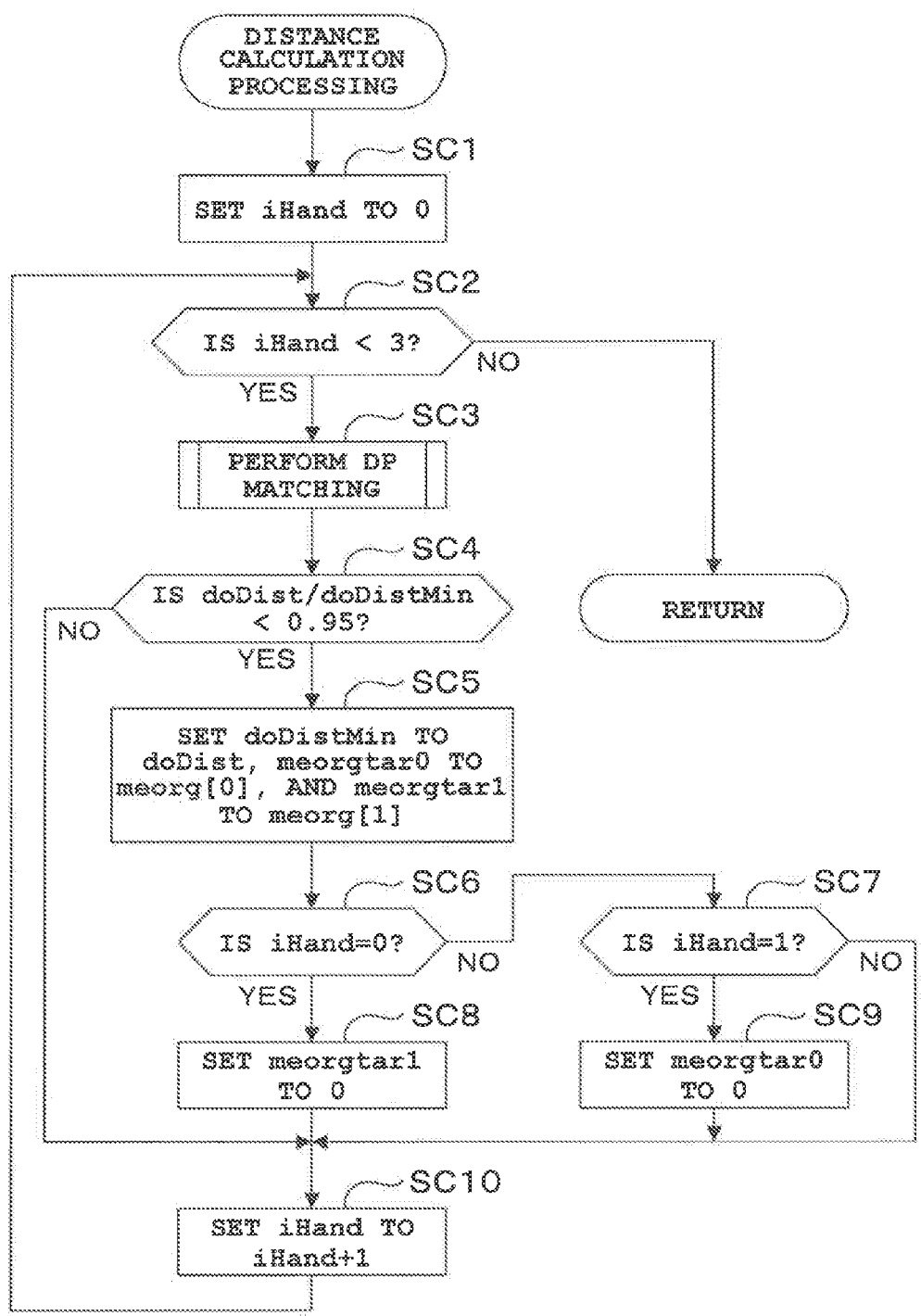
FIG. 4 is a flowchart of operations in distance calculation processing.

Next operations in the distance calculation processing will be described with reference to FIG. 4. When the distance calculation processing is started at Step SB6 (see FIG. 3) of the above-described corresponding point identification processing, the CPU 13 proceeds to Step SC1 shown in FIG. 4 and stores "0" in a register iHand. The value of the register iHand specifies a part in the song data. Specifically, "0" specifies the right-hand part in the song data and "1" specifies the left-hand part in the song data. "2" specifies the left-hand and right-hand part in the song data. The value of the register iHand is hereinafter referred to as part specification data iHand.

Next, at Step SC2, the CPU 13 judges whether or not the part specification data iHand is less than "3", or in other words, whether or not the distance calculation has been completed for all the parts. When judged that the part specification data iHand is less than "3" and the distance calculation has not been completed for all the parts, the judgment result is "YES" and therefore the CPU 13 performs the DP matching processing at Step SC3. In the DP matching processing, the CPU 13 acquires a distance doDist equivalent to the degree of similarity to all musical notation data (the right-hand part, the left-hand part and the left-hand and right-hand part) in the song data for the music playing data generated by the playing and inputting of music by the user, as described hereafter.

Next, at Step SC4, the CPU 13 judges whether or not the distance doDist currently acquired in the DP matching processing at Step SC3 is less than 95% of the preceding acquired distance doDistMin (in the initial operation, the predetermined value stored at Step SB1 is used) or in other words, whether or not the shortest distance has been updated. When judged that the shortest distance has not been updated, the judgment result is "NO" and therefore the CPU 13 proceeds to Step SC10 described hereafter.

Conversely, when judged that the currently acquired distance doDist is less than 95% of the preceding acquired distance doDistMin and the shortest distance has been updated, the judgment result at Step SC4 is "YES" and therefore the CPU 13 proceeds to Step SC5. At Step SC5, the CPU 13 updates the distance doDistMin with the distance doDist. In addition, at Step SC5, the CPU 13 sets the value of the pointer meorg[0] in the pointer meorgtar0 and the value of the pointer meorg[1] in the pointer meorgtar1.

Then, the CPU 13 proceeds to Step SC6 and judges whether or not the hand specification data iHand is "0", or in other words, whether or not distance calculation is performed on the right-hand part. When judged that distance calculation is performed on the right-hand part, the judgment result is "YES", and therefore the CPU 13 proceeds to Step SC8 and resets the pointer meorgtar1 to "0". At subsequent Step SC10, the CPU 13 increments stepping of the part specification data iHand, and then returns to the above-described processing at Step SC2.

Conversely, when judged that the part specification data iHand is not "0", or in other words, distance calculation is not performed on the right-hand part, the judgment result at Step SC6 is "NO", and therefore the CPU 13 proceeds to Step SC7 and judges whether or not the part specification data iHand is "1", or in other words, whether or not distance calculation is performed on the left-hand part. When judged that distance calculation is performed on the left-hand part, the judgment result is "YES", and therefore the CPU 13 proceeds to Step SC9 and resets the pointer meorgtar0 to "0". At subsequent Step SC10, the CPU 13 increments stepping of the part specification data iHand, and then returns to the above-described processing at Step SC2.

On the other hand, when judged that distance calculation is not performed on the left-hand part, or in other words, distance calculation is performed on the left-hand and right-hand part, the judgment result at above-described Step SC7 is "NO", and therefore the CPU 13 proceeds to Step SC10. At Step SC10, the CPU 13 increments stepping of the part specification data iHand, and then returns to the above-described processing at Step SC2. At Step SC2, when judged that the forwarded part specification data iHand is greater than "3", the judgment result at Step SC2 is "NO" and therefore the CPU 13 ends the distance calculation processing.

(4) Operations in the DP Matching Processing

Figure 5:
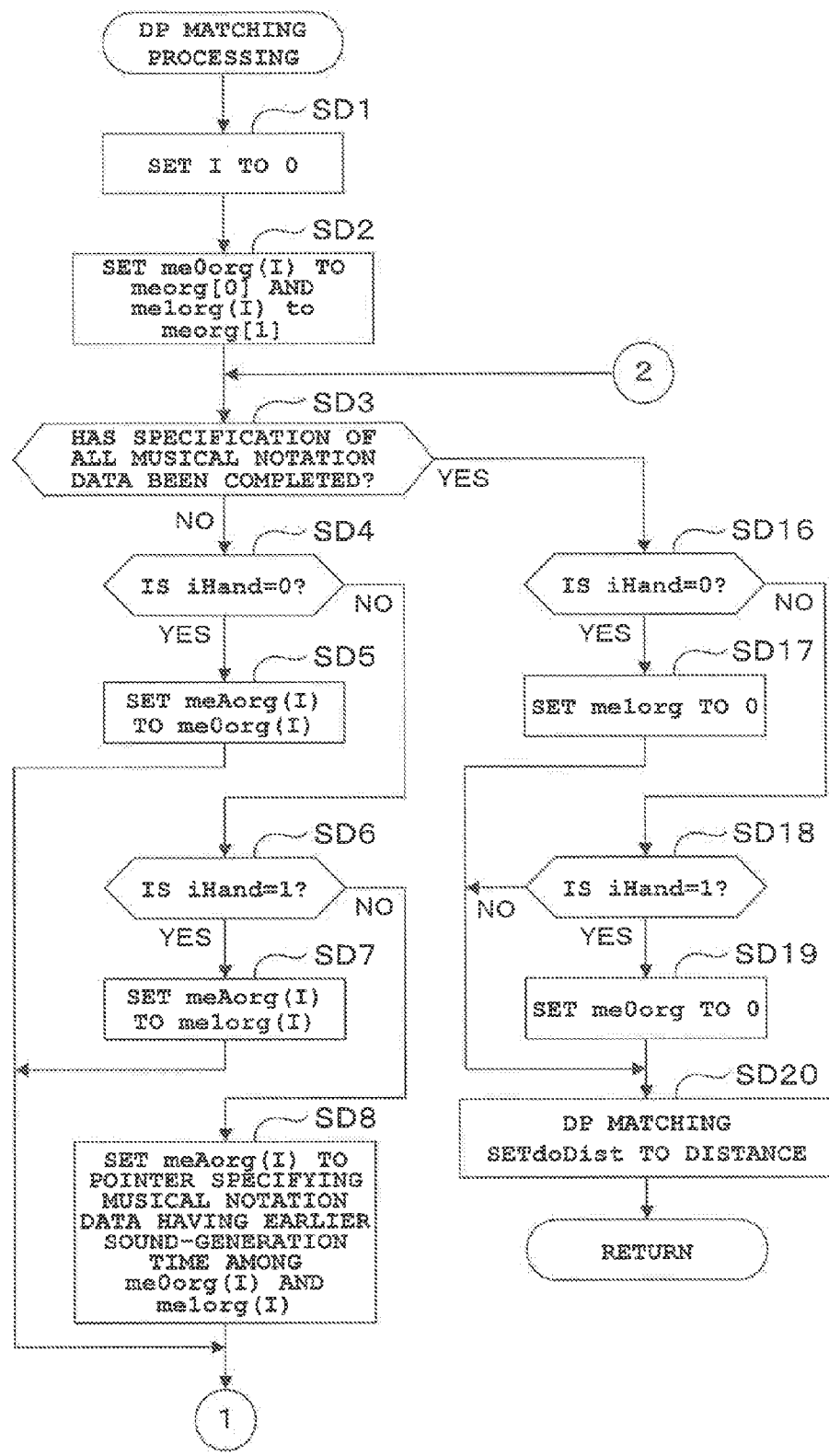
FIG. 5 is a flowchart of operations in DP matching processing.

Next, operations in the DP matching processing will be described with reference to FIG. 5 to FIG. 6. When the DP matching processing is started at Step SC3 (see FIG. 4) of the distance calculation processing, the CPU 13 proceeds to Step SD1 shown in FIG. 5 and resets a pointer I specifying musical notation data to an initial value "0".

Next, at Step SD2, the CPU 13 sets the value of the pointer meorg[0] in a pointer me0org(I) and the value of the pointer meorg[1] in a pointer me1org(I). The pointer meorg[0] herein is a pointer value that specifies the head musical notation data of the right-hand part in the song data, and the pointer meorg[1] herein is a pointer value that specifies the head musical notation data of the left-hand part in the song data.

Then, at Step SD3, the CPU 13 judges whether or not all the musical notation data have been specified based on the forwarding of the pointer I. When judged that not all of the musical notation data have been specified, the judgment result at Step SD3 is "NO" and therefore the CPU 13 proceeds to Step SD4. At Step SD4, the CPU 13 judges whether or not the part specification data iHand is "0", or in other words, whether or not DP matching is performed on the right-hand part. When judged that DP matching is performed on the right-hand part, the judgment result at Step SD4 is "YES" and therefore the CPU 13 proceeds to Step SD5. At Step SD5, the CPU 13 sets a pointer meAorg(I) to the pointer me0org(I), and proceeds to Step SD9 (described hereafter) in FIG. 6.

Conversely, when judged that DP matching is not performed on the right-hand part, the judgment result at Step SD4 is "NO" and therefore the CPU 13 proceeds to Step SD6.

At Step SD6, the CPU 13 judges whether or not the hand specification data iHand is "1", or in other words, whether or not DP matching is performed on the left-hand part. When judged that DP matching is performed on the left-hand part, the judgment result at Step SD6 is "YES" and therefore the CPU 13 proceeds to Step SD7. At Step SD7, the CPU 13 sets the pointer meAorg(I) to the pointer me1org(I) and proceeds to Step SD9 (described hereafter) in FIG. 6.

On the other hand, when judged that the DP matching is performed on the left-hand and right-hand part, the judgment result at Step SD6 is "NO" and therefore the CPU 13 proceeds to Step SD8. At Step SD8, the CPU 13 compares the sound-generation time iTime of musical notation data specified by the pointer me0org(I) with the sound-generation time iTime of musical notation data specified by the pointer me1org(I) and sets the pointer meAorg(I) to a pointer specifying musical notation data having an earlier sound-generation time. The CPU 13 then proceeds to Step SD9 in FIG. 6.

Figure 6:
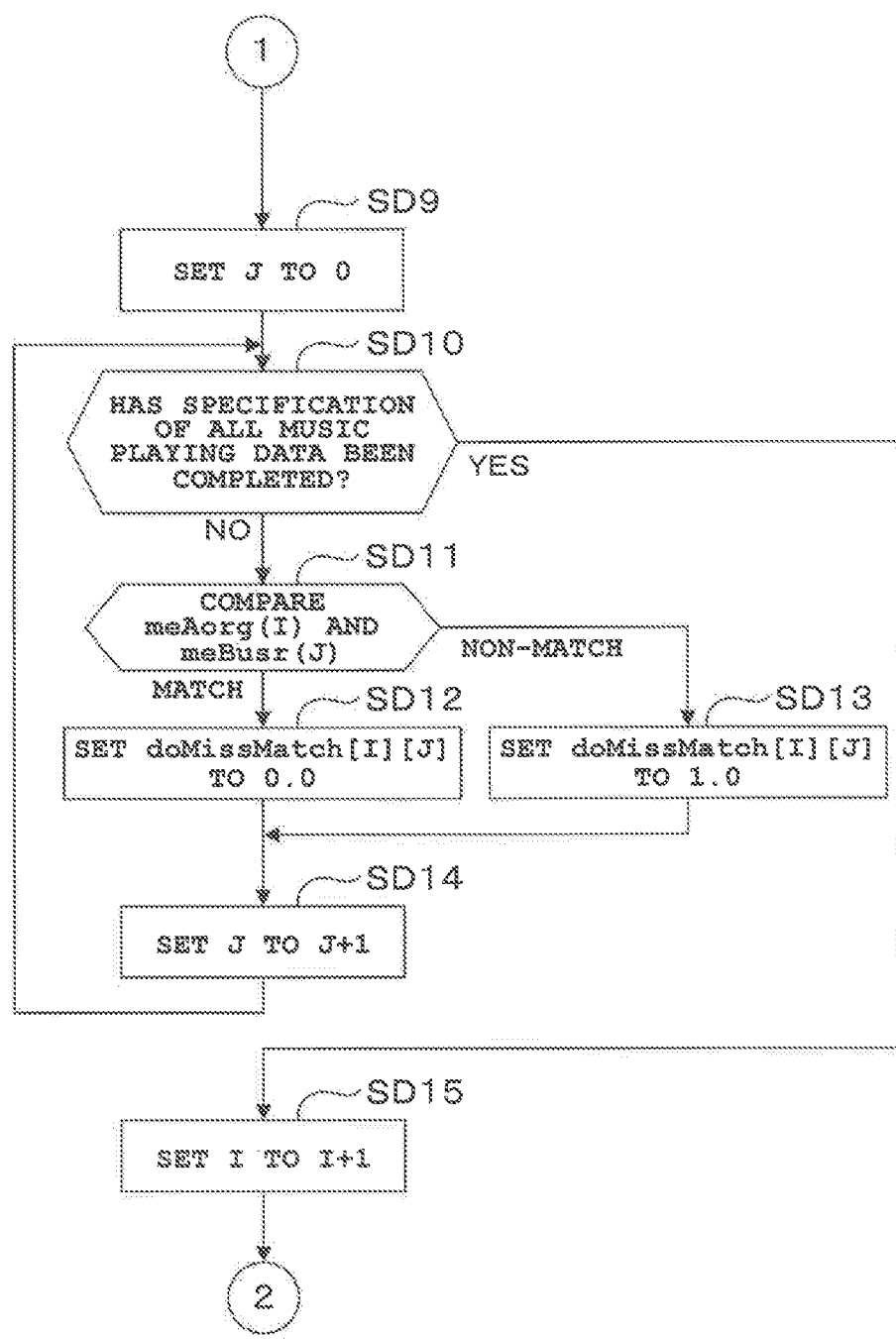
FIG. 6 is a flowchart of operations in the DP matching processing following those in FIG. 5.

At Step SD9 in FIG. 6, the CPU 13 sets a pointer "J" that specifies music playing data to an initial value "0". Next, at Step SD10, the CPU 13 judges whether or not all the music playing data have been specified based on the forwarding of the pointer J. When judged that not all of the music playing data have been specified, the judgment result at Step SD10 is "NO" and therefore the CPU 13 proceeds to Step SD11.

At Step SD11, the CPU 13 compares the pitch iPit of the musical notation data specified by the pointer meAorg(I) with the pitch of music playing data specified by a pointer meBusr (J). When judged that the pitch of the musical notation data and the pitch of the music playing data match, the CPU 13 proceeds to Step SD12 and sets a register doMissMatch[I][J] to a matching value "0.0". Conversely, when judged that the pitch of the musical notation data and the pitch of the music playing data do not match, the CPU 13 proceeds to Step SD13 and sets the register doMissMatch[I][J] to a non-matching value "1.0".

Next, at Step SD14 the CPU 13 increments stepping of the pointer and returns to above-described Step SD10. Hereafter, the CPU 13 repeats above-described Step SD10 to Step SD14 while forwarding the pointer J, and thereby judges whether the pitch iPit of the musical notation data specified by the pointer meAorg(I) matches or does not match for all the music playing data, and stores the judgment result in a two-dimensional register doMissMatch[I][J] equivalent to a matching/non-matching matrix. When all the music playing data are specified by the forwarding of the pointer J, the judgment result at Step SD10 is "YES" and therefore the CPU 13 proceeds to Step SD15. At Step SD15, the CPU 13 increments stepping of the pointer I, and then returns to above-described Step SD3 (see FIG. 5).

Then, when all the musical notation data are specified by the forwarding of the pointer I, the judgment result at Step SD3 is "YES" and therefore the CPU 13 proceeds to Step SD16. At Step SD16, the CPU 13 judges whether or not the part specification iHand is "0", or in other words, whether DP matching is performed on the right-hand part. When judged that DP matching is performed on the right-hand part, the judgment result at Step SD16 is "YES" and therefore the CPU 13 proceeds to Step SD17. At Step SD17, the CPU 13 resets a pointer me1org to "0" and proceeds to Step SD20.

Conversely, when judged that the part specification data iHand is not "0", or in other words, DP matching is not performed on the right-hand part, the judgment result at Step SD16 is "NO" and therefore the CPU 13 proceeds to Step SD18. At Step SD18, the CPU 13 judges whether or not the part specification data iHand is "1", or in other words, whether or not DP matching is performed on the left-hand part. When judged that DP matching is performed on the left-hand part, the judgment result at Step SD18 is "YES" and therefore the CPU 13 proceeds to Step SD19. At Step SD19, the CPU 13 resets a pointer me0org to "0", and proceeds to Step SD20.

On the other hand, when judged that PP matching is performed on the left-hand and right-hand part, the judgment results at Step SD16 and Step SD18 are "NO" and therefore the CPU 13 proceeds to Step SD20. At Step SD20, the CPU 13 acquires the distance doDist equivalent to the degree of similarity to all the musical notation data (the right-hand part, the left-hand part, and the left-hand and right-hand part) in the song data for the music playing data generated by the playing and inputting of music by the user, by performing known DP matching based on the matching/non-matching matrix stored in the two-dimensional register doMissMatch[I] and [J], and ends the DP matching processing.

(5) Operations in the Musical Performance Judgment Processing

Figure 7:
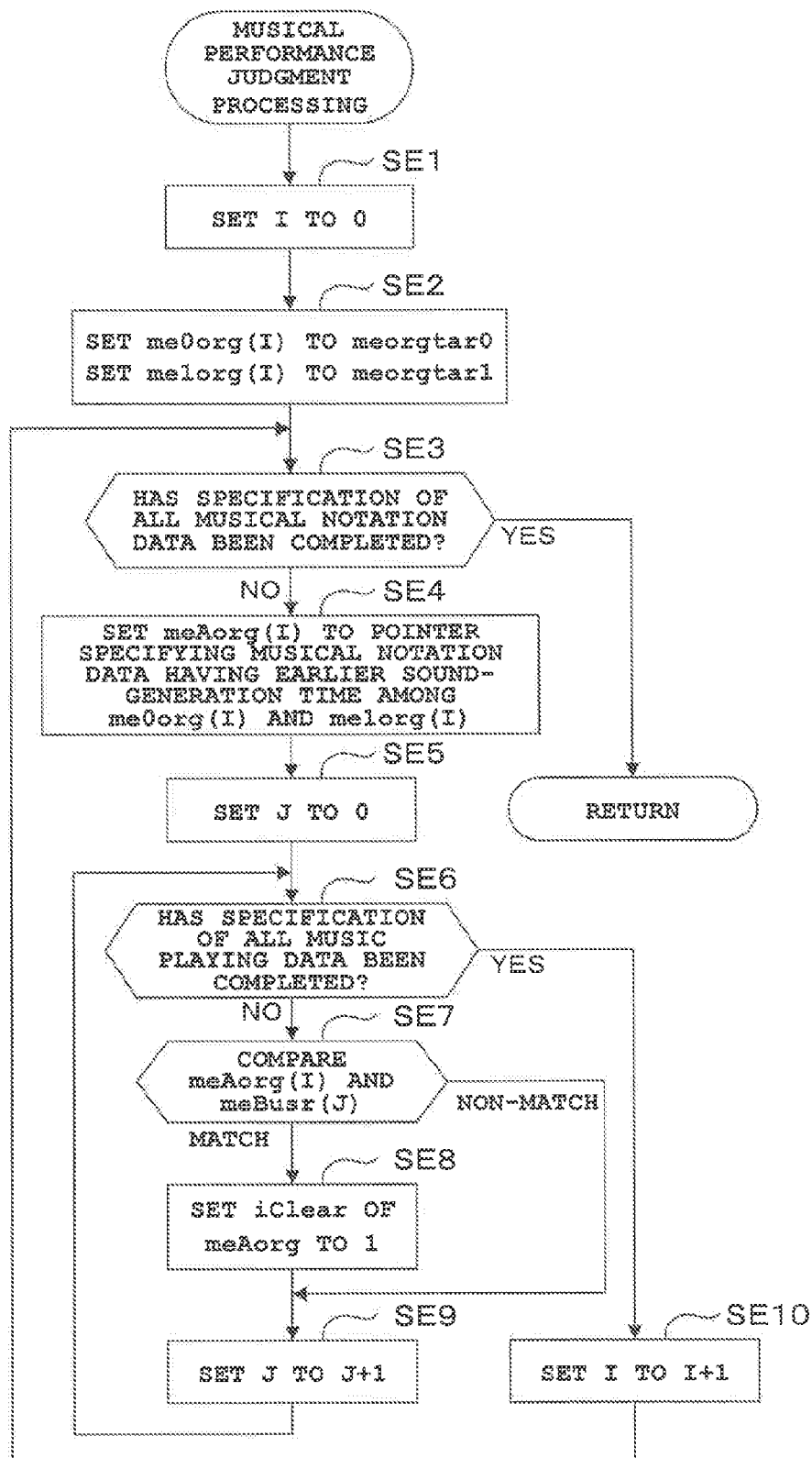
FIG. 7 is a flowchart of operations in musical performance judgment processing.

Next, operations in the musical performance judgment processing will be described with reference to FIG. 7. When the musical performance judgment processing is started at Step SA5 (see FIG. 2) of the main routine, the CPU 13 proceeds to Step SE1 in FIG. 7 and sets the pointer I that specifies musical notation data to an initial value "0".

Next, at Step SE2, the CPU 13 sets in the pointer me0org(I) the value of the pointer meorgtar0 that specifies musical notation data corresponding to music playing data generated by the playing and inputting of music by the user, from among the musical notation data of the right-hand part in the song data. In addition, the CPU 13 sets in the pointer me1org(I) the value of the pointer meorgtar1 that specifies musical notation data corresponding to music playing data generated by the playing and inputting of music by the user from among the musical notation data of the left-hand part in the song data.

Then, at Step SE3, the CPU 13 judges whether or not all the musical notation data have been specified based on the forwarding of the pointer I. When judged that not all of the musical notation data have been specified, the judgment result at Step SE3 is "NO", and therefore the CPU 13 proceeds to Step SE4. At Step SE4, the CPU 13 compares the sound-generation time iTime of musical notation data specified by the pointer me0org(I) with the sound-generation time iTime of musical notation data specified by the pointer me1org(I) and sets the pointer meAorg(I) to a pointer specifying musical notation data having an earlier sound-generation time.

Then, at Step SE5, the CPU 13 sets the pointer "J" that specifies music playing data to the initial value "0". Next, at Step SE6, the CPU 13 judges whether or not all the music playing data have been specified based on the forwarding of the pointer J. When judged that not all of the music playing data have been specified, the judgment result at Step SE6 is "NO" and therefore the CPU 13 proceeds to Step SE7. At Step SE7, the CPU 13 compares the pitch iPit of the musical notation data specified by the pointer meAorg(I) with the pitch of music playing data specified by the pointer meBusr (J).

When judged that the pitch of the musical notation data and the pitch of the music playing data match, the CPU 13 proceeds to Step SE8. At Step SE8, the CPU 13 sets a clear flag iClear of the musical notation data specified by the pointer meAorg(I) to "1", and thereby indicates that the sound is correctly played. Then, the CPU 13 proceeds to Step SE9, and after incremental stepping of the pointer 3, returns to above-described Step SE6. Hereafter, the CPU 13 repeats above-described Step SE6 to Step SE9 while forwarding the pointer J.

Then, when all the music playing data are specified by the forwarding of the pointer J, the judgment result at Step SE6 is "YES" and therefore the CPU 13 proceeds to Step SE10. At Step SE10, the CPU 13 increments stepping of the pointer I, and then returns to above-described Step SE3. When all the musical notation data are specified by the forwarding of the pointer I, the judgment result at Step SE3 is "YES" and therefore the CPU 13 ends the musical performance judgment processing.

(6) Operations in the Achievement Level Calculation Processing

Figure 8:
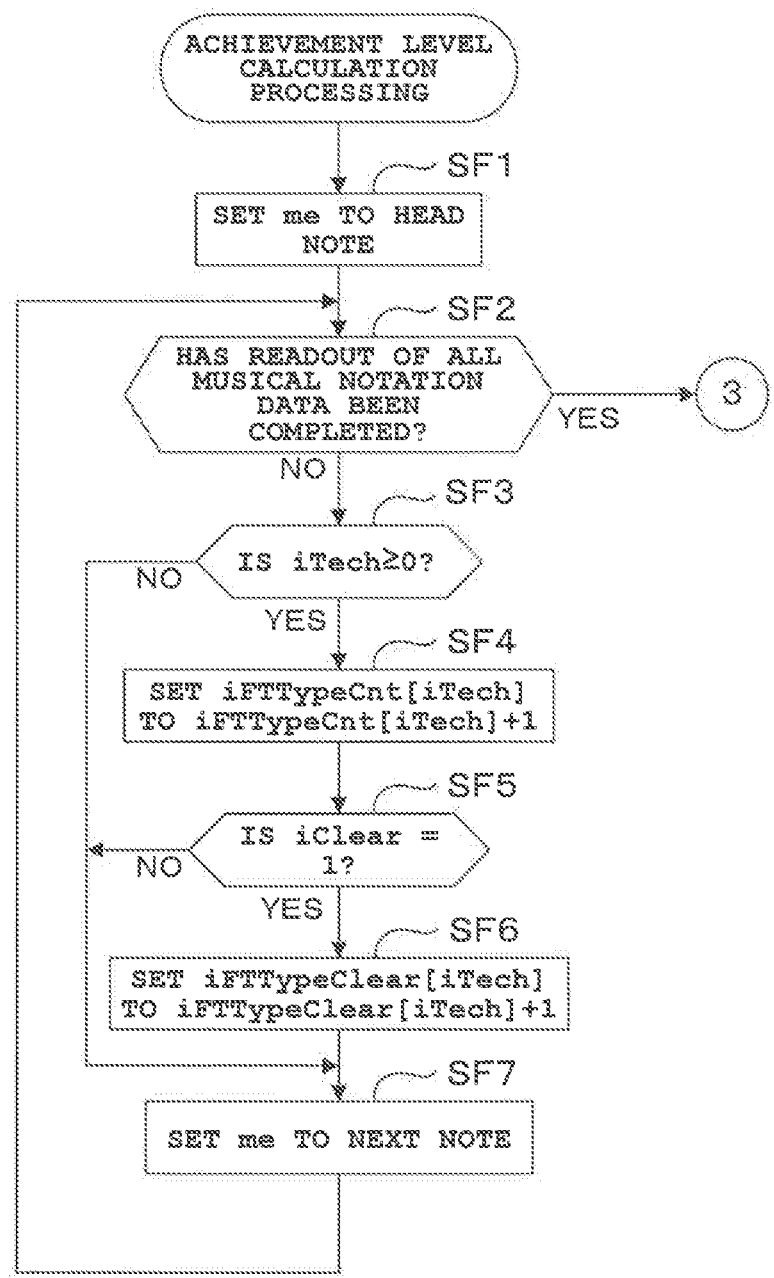
FIG. 8 is a flowchart of operations in achievement level calculation processing.

Next, operations in the achievement level calculation processing will be described with reference to FIG. 8 to FIG. 9. When the achievement level calculation processing is started at Step SA6 (see FIG. 2) of the main routine, the CPU 13 proceeds to Step SF1 in FIG. 8 and stores the musical notation data of the head note (first sound of song) in a register "me". Next, at Step SF2, the CPU 13 judges whether or not all the musical notation data in the song data have been read out. When judged that not all of the musical notation data have been read out, the judgment result at Step SF2 is "No" and therefore the CPU 13 proceeds to Step SF3.

At Step SF3, the CPU 13 judges whether or not the musical performance technique type iTech included in the musical notation data stored in the register "me" is "0" or more, or in other words, a note requiring musical performance technique. When the musical performance technique type iTech is a negative value, the note does not require musical performance technique. Accordingly, the judgment result is "NO" and therefore the CPU 17 proceeds to Step SF7. At Step SF7, the CPU 13 stores the next musical notation data in the register "me", and then returns to above-described Step SF2.

On the other hand, when the musical performance technique type iTech included in the musical notation data stored in the register "me" is "0" or more and the type of musical performance technique is indicated, the judgment result at Step SF3 is "YES" and therefore the CPU 13 proceeds to Step SF4. At Step SF4, the CPU 13 increments stepping of a counter iFTTypeCnt[iTech] that counts the number of occurrences for each musical performance technique type iTech.

Next, at Step SF5, the CPU 13 judges whether or not the clear flag iClear included in the musical notation data stored in the register "me" is "1", or in other words, whether or not the note has been correctly played. When the note has not been correctly played (the clear flag iClear is "0"), the judgment result at Step SF5 is "NO" and therefore the CPU 13 proceeds to Step SF7. At Step SF7, the CPU 13 stores the next musical notation data in the register "me", and then returns to above-described Step SF2.

Conversely, when the note has been correctly played, the judgment result at Step SF5 is "YES" and therefore the CPU 13 proceeds to Step SF6. At Step SF6, the CPU 13 increments stepping of a counter iFTTypeClear[iTech] that counts the number of times cleared for each musical performance technique type iTech. Then, the CPU 13 proceeds to Step SF7, and after storing the next musical notation data in the register "me", returns to above-described Step SF2.

Hereafter until all the musical notation data are read out the CPU 13 repeats above-described Step SF2 to Step SF7, whereby the number of occurrences for each musical performance technique type iTech is counted by the counter iFTTypeCnt[iTech] and the number of times cleared for each musical performance technique type iTech is counted by the counter iFTTypeClear[iTech]

Figure 9:
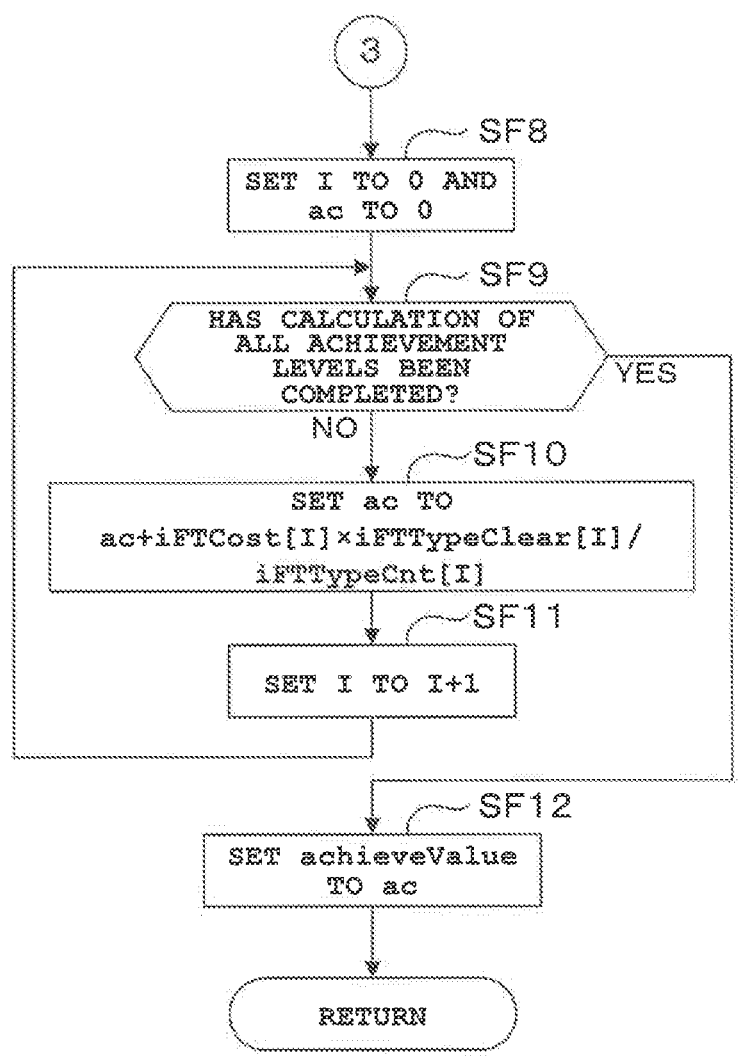
FIG. 9 is a flowchart of operations in the achievement level calculation processing following those in FIG. 8.

When all the musical notation data are read out, the judgment result at Step SF2 is "YES" and therefore the CPU 13 proceeds to Step SF8 in FIG. 9. At Step SF8 the CPU 13 clears the pointer I that specifies the type of musical performance technique and a register "ac" to "0". Note that the register "ac" herein stores an achievement level indicating improvement in playing skills as described later, which is hereinafter referred to as achievement level "ac". Next, at Step SF9, the CPU 13 judges whether or not the calculation of an achievement level "ac" for each type of musical performance technique has been completed, When the calculation has not been completed, the judgment result at Step SF9 is "NO" and therefore the CPU 13 proceeds to Step SF10.

At Step SF10 to Step SF11, the CPU 13 calculates the achievement level "ac" for the type of musical performance technique specified by the pointer I by multiplying an accuracy rate, which is acquired by dividing the number of times cleared (counter iFTTypeClear[I]) by the number of occurrences (counter iFTTypeClear[I]), with a difficulty level that is read out from the difficulty level table iFTCost in accordance with the pointer I, and accumulates it along with the forwarding of the pointer I.

At above-described Step SF10, when the achievement level "ac" is calculated for all the musical performance technique types, the achievement levels "ac" calculated for each musical performance technique type are accumulated. As a result, the CPU 13 acquires an achievement level "ac" that takes into account the difficulty level of the song played and inputted by the user. In addition, when the achievement levels "ac" for all the musical performance technique types are calculated, the judgment result at Step SF9 is "YES" and therefore the CPU 13 proceeds to Step SF12. At Step SF12, the CPU 13 stores the achievement level ac that has taken into account the difficulty level of the song in a register achieveValue (hereinafter referred to as achievement level achieveValue) and ends the achievement level calculation processing.

(7) Operations in the Variable Update Processing

It is known that, in the Q—learning that is a type of reinforcement learning, "action is taken in accordance with a current rule, a value function (rule evaluation) is created from a reward obtained through the action, and an optimal rule is created from the current value function".

In the variable update processing, this Q-learning theory is applied. Specifically, a state variable in the value function table "value" is updated based on an achievement level (reward) acquired by the playing and inputting of music (action) in accordance with current advice (rule), and the most effective advice (rule) is acquired from the value function table "value" based on the updated state variable.

Figure 10:
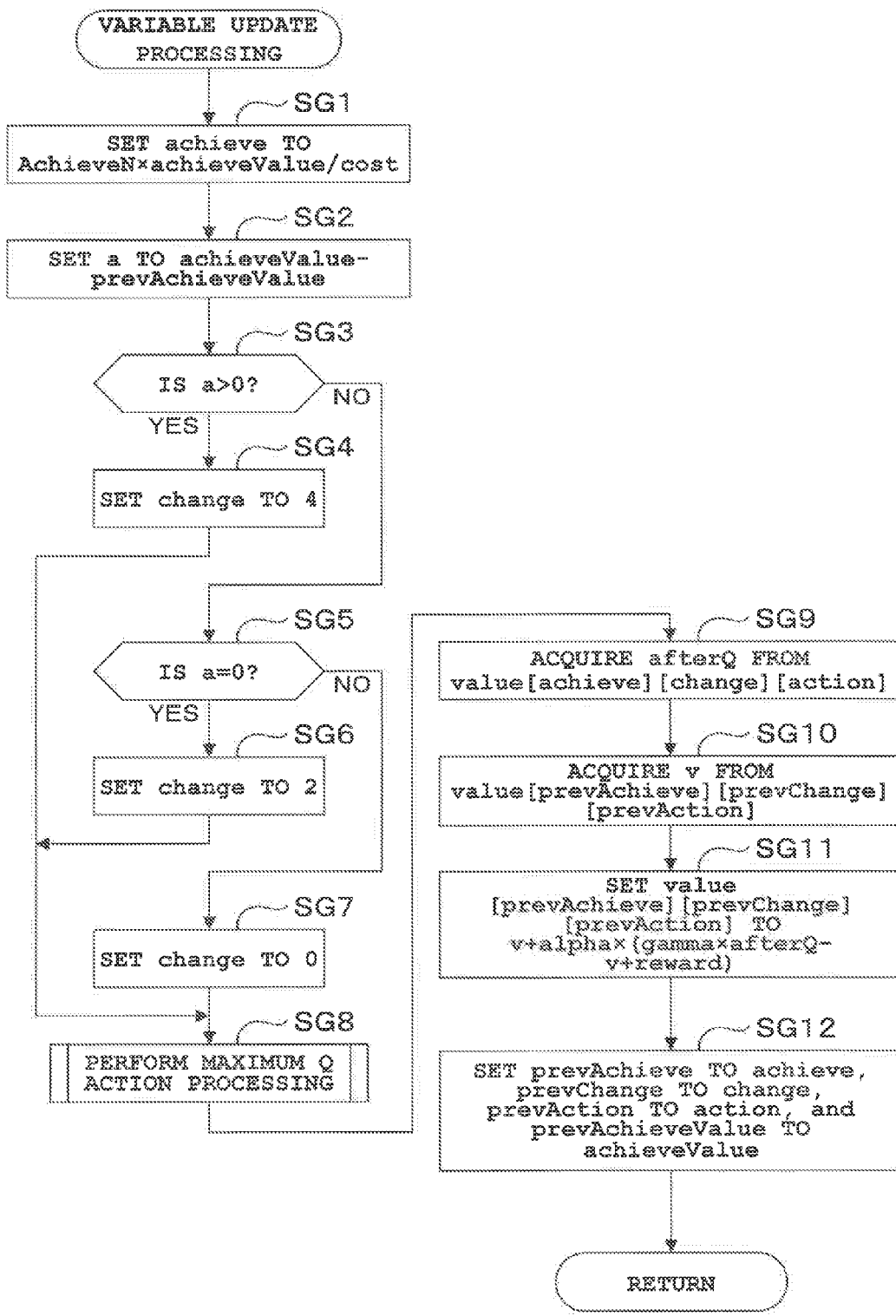
FIG. 10 is a flowchart of operations in variable update processing.

Hereinafter, operations in this variable update processing will be described with reference to FIG. 10. When the variable update processing is started at Step SA7 (see FIG. 2) of the above-described main routine, the CPU 13 proceeds to Step SG1 shown in FIG. 10. At Step SG1, the CPU 13 calculates an achievement level rank "achieve" that serves as a state variable in the Q-learning, by multiplying an achievement level number AchieveN (constant number) by an achievement rate (achievement level achieveValue/difficulty level of song "cost").

Next, at Step SG2, the CPU 13 calculates an achievement level difference "a" by subtracting the previous achievement level prevAchieveValue from the current achievement level achieveValue. Then, at Step SG3, the CPU 13 judges whether or not the calculated achievement level difference "a" is greater than "0", or in other words, whether or not the achievement level has increased. When judged that the achievement level has increased (a>0), the judgment result is "YES" and therefore the CPU 13 proceeds to Step SG4. At Step SG4, the CPU 13 sets a register "change" to "4" and proceeds to Step SG8. The value of the register "change" is hereinafter referred to as the achievement level rank change. This achievement level rank change "change" serves as a state variable in the Q-learning.

Conversely, when judged that the achievement level difference "a" is "0" or less, or in other words, the achievement level remains the same or has decreased, the judgment result at Step SG3 is "NO" and therefore the CPU 13 proceeds to Step SG5. At Step SG5, the CPU 13 judges whether or not the calculated achievement level difference "a" is "0", or in other words, whether or not the achievement level remains the same. When judged that the achievement level remains the same (a=0), the judgment result is "YES" and therefore the CPU 13 proceeds to Step SG6. At Step SG6, the CPU 13 sets the achievement level rank change "change" to "2", and then proceeds to Step SG8. On the other hand, when judged that the achievement level has decreased (a<0), the judgment result at Step SG5 is "NO" and therefore the CPU 13 proceeds to Step SG7. At Step SG7, the CPU 13 sets the achievement level rank change "change" to "0" and proceeds to Step SG8.

At Step SG8, the CPU 13 performs the maximum Q action processing for retrieving the most effective (maximum Q action value max Q) advice type "action" from the value function table "value" [achieve][change][i] while forwarding an action number search pointer i, in a state specified by the achievement level rank "achieve" and the achievement level rank change "change".

Next, at Step SG9, the CPU 13 acquires a current value afterQ of the advice type "action" in the current state specified by the achievement level rank "achieve" and the achievement level rank change "change", from the value function table "value" [achieve][change][action]. Then, at Step SG10 the CPU 13 acquires a previous value "v" of a previous advice type prevAction in a previous state specified by an achievement level rank prevAchieve and an achievement level rank change prevChange, from the value function table "value" [prevAchieve][prevChange][prevAction]

Next, at Step SG11, the CPU 13 updates the previous state and the previous value "v" based on the current value afterQ, in accordance with the following formula (1)

$$\text{value}[\text{prevAchieve}][\text{prevChange}][\text{prevAction}] \leftarrow v + \text{alpha} \times (\text{gamma} \times \text{afterQ} - v + \text{reward}) \qquad (1)$$

Note that, in the above-described formula (1), alpha is a learning rate, gamma is a reduction rate, and reward is a reward (achievement level achieveValue).

Then, at Step SG12, the CPU 13 updates the previous achievement level rank prevAchieve, the previous achievement level rank change prevChange, the previous advice type prevAction, and the previous achievement level pevAchieveValue with the current achievement level rank "achieve", the current achievement level rank change "change", the current advice type "action", and the current achievement level achieveValue, respectively, and ends the variable update processing.

(8) Operations in the Maximum Q Action Processing

Figure 11:
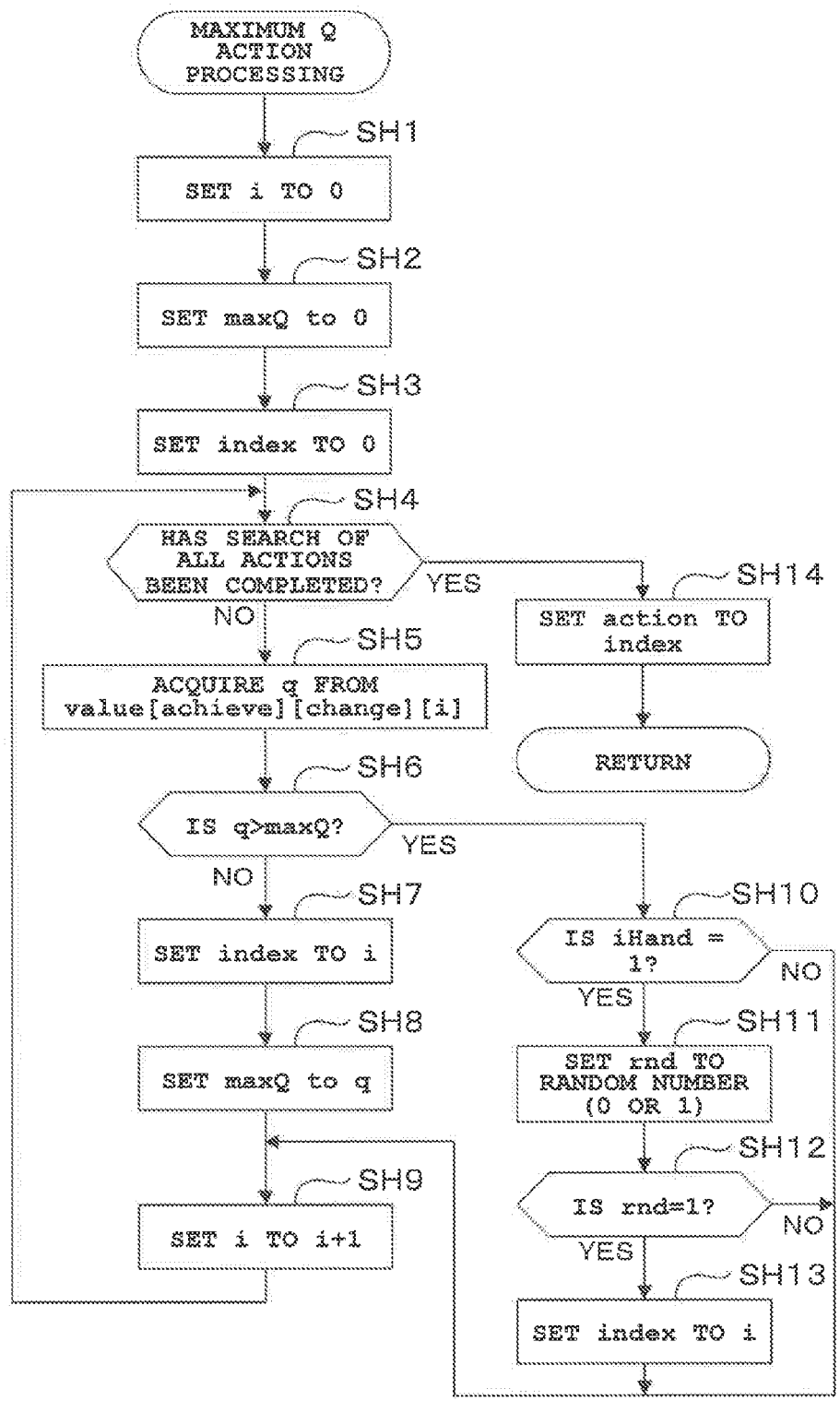
FIG. 11 is a flowchart of operations in maximum Q action processing.

Next, operations in the maximum Q action processing will be described with reference to FIG. 11. When the maximum Q action processing is started at Step SG8 (see FIG. 10) of the above-described variable update processing, the CPU 13 proceeds to Step SH1 shown in FIG. 11. At Step SH1 to Step SH3, the CPU 13 clears the action number search pointer i, the maximum Q action value maxQ, and an action type "index" to "0".

Then, at Step SH4, the CPU 13 judges whether or not search has been completed for all the actions. When judged that the search has not been completed, the judgment result is "NO". Accordingly, the CPU 13 proceeds to Step SH5 and acquires an advice value q based on the action number search pointer i from the value function table "value" [achieve] [change][i], in the state specified by the achievement level rank "achieve" and the achievement level rank change "change".

Figure 12:
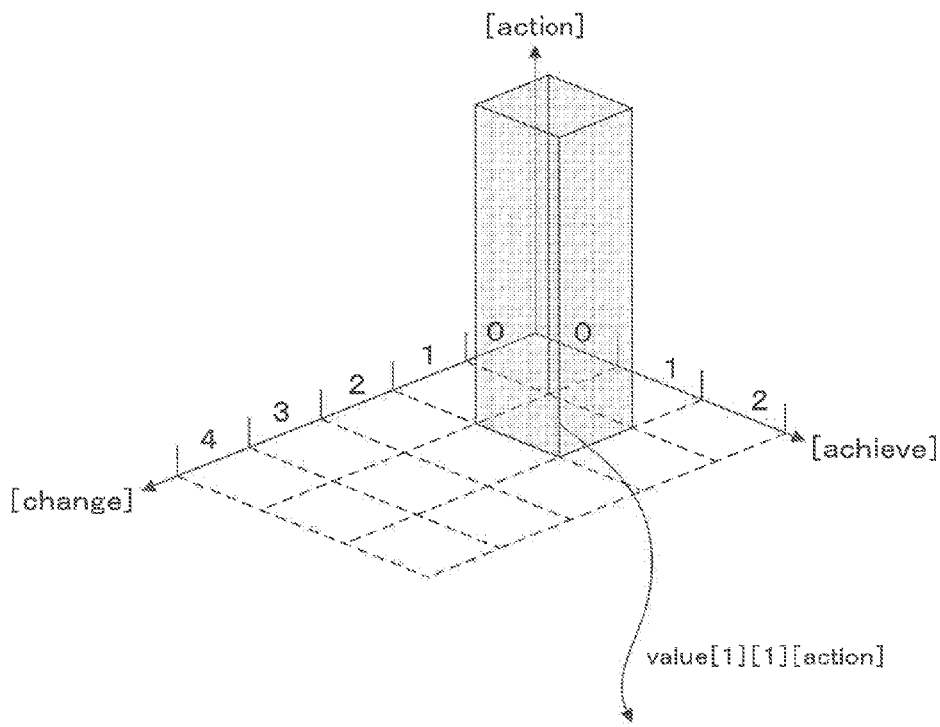
FIG. 12 is a diagram showing an example of a value function table "value"

Here, processing for acquiring the advice value q based on the action number search pointer i from the value function table "value" in the state specified by the achievement level rank "achieve" and the achievement level rank change "change" will be described with reference to FIG. 12. For example, in a case where the achievement level rank "achieve" is "1" and the achievement level rank change "change" is "1", a plurality of actions (advice) and advice values q0 to qn associated with these actions have been registered in the value function table "value" [1][1][action], as shown in the example in FIG. 12. At Step SH5, the CPU 13 reads out the advice value q based on the action number search pointer i from the value function table "value" [achieve][change][i]

Then, at Step SH6, the CPU 13 judges whether or not the advice value q read out from the value function table "value" [achieve][change][i] is greater than the maximum Q action value maxQ. At the initial pass, the maximum Q action value maxQ has been cleared and set to "0" at Step SH2. Therefore, the judgment result is NO and therefore the CPU 13 proceeds to Step SH7. At Step SH7, the CPU 13 stores the action number search pointer in the action type "index". Then, at subsequent Step S118, the CPU 13 stores the advice value q read out from the value function table "value" [achieve] [change][i] based on the action number search pointer I, as the maximum Q action value maxQ.

Next, at Step SH9, the CPU 13 increments stepping of the action number search pointer i and returns to above-described Step SH4. Subsequently, the CPU 13 reads out the advice value q from the value function table "value" [achieve] [change][i] based on the forwarding of the action number search pointer i. Then, when the read out advice value q exceeds the maximum Q action value maxQ, the judgment result at above-described Step SH6 is "YES" and therefore the CPU 13 proceeds to Step SH10.

At Step SH10 to Step SH13, to avoid monotony where the retrieved maximum Q action value maxQ is always the same, the CPU 13 adds an element that randomly changes. That is, at Step SH10, the CPU 13 judges whether or not the part specification data iHand is "1", or in other words, whether or not the distance calculation prior to the calculation of the achievement value achieveValue has been performed on the left-hand part. When judged that the distance calculation has been performed on the right-hand part, the judgment result is "NO". Accordingly, the CPU 13 proceeds to above-described Step SH9, and after forwarding the action number search pointer i, returns to above-described Step SH4. In this instance, the element that randomly changes is not added.

Conversely, when judged that the distance calculation has been performed on the left-hand part, the judgment result at above-described Step SH10 is "YES", and therefore the CPU 13 proceeds to Step SH11. At Step SH11, the CPU 13 generates a random number of either "0" or "1", and stores it in a register rnd. Next, at Step SH12, the CPU 13 judges whether or not the random number value in the register rnd is "1". When judged that the random number value in the register rnd is "0", the judgment result is "NO", and therefore the CPU 13 proceeds to above-described. Step SH9. On the other hand, when judged that the random number value in the register rnd is "1", the judgment result is "YES", and therefore the CPU 13 proceeds to Step SH13. At Step SH13, the CPU 13 sets the action number search pointer in the advice type "index", and then proceeds to above-described Step SH9. As a result, the element that randomly changes is added.

When the CPU 13 completes the search of all the actions (advice types) from the value function table "value" [achieve] [change][i] based on the forwarding of the action number search pointer i while adding the element that randomly changes, the judgment result at above-described Step SH4 is "YES". Accordingly, the CPU 13 sets the action type "index" specifying the advice value q that has become the maximum Q action value maxQ in the advice type "action" and ends the maximum Q action processing.

(9) Operations in the Advice Processing

Figure 13:
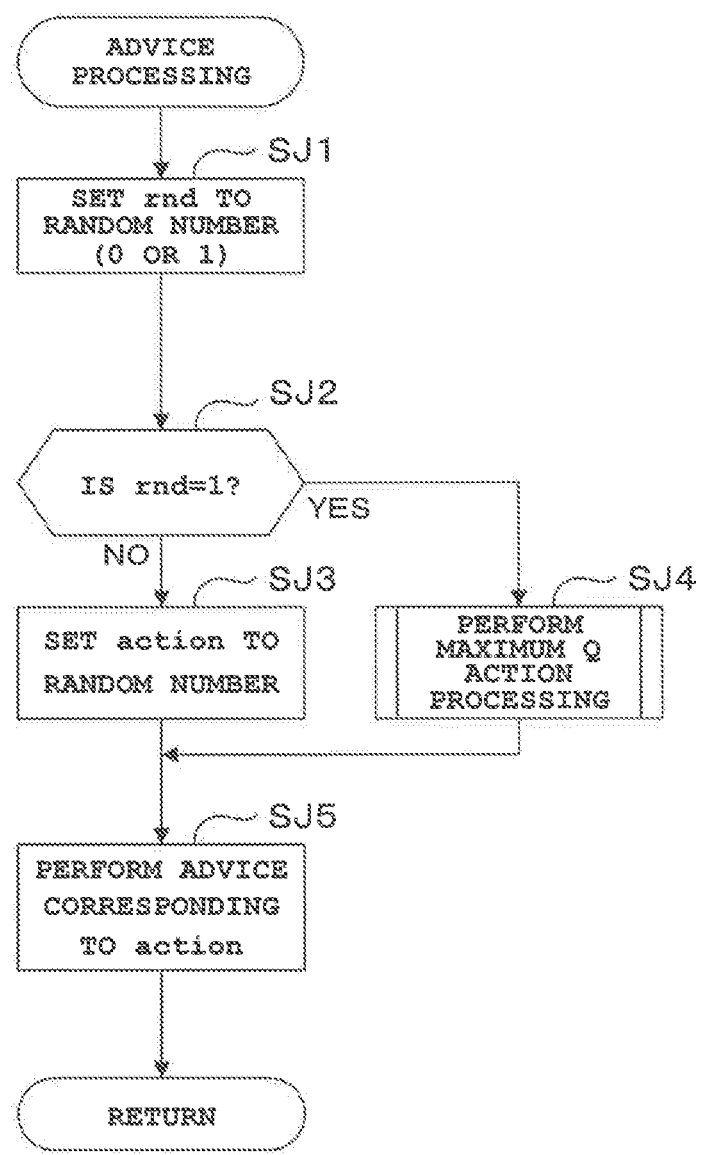
FIG. 13 is a flowchart of operations in advice processing

Next operations in the advice processing will be described with reference to FIG. 13. When the advice processing is started at Step SA8 (see FIG. 2) of the above-described main routine, the CPU 13 proceeds to Step SJ1 shown in FIG. 13. At Step SJ1, the CPU 13 generates a random number value of "0" or "1" and stores it in the register rnd. Then, at subsequent Step SJ2, the CPU 13 judges whether or not the random number value in the register rnd is "1" When judged that the random number value in the register rnd is "0", the judgment result is "NO", and therefore the CPU 13 proceeds to Step SJ3. At Step SJ3, the CPU 13 generates a random number within the range of the number of the advice types, and after setting the generated random number in the advice type "action", proceeds to Step SJ5 described hereafter.

At Step SJ2, when judged that the random number value in the register rnd. "1", the judgment result at Step SJ2 is "YES", and therefore the CPU 13 proceeds to Step SJ4. At Step SJ4, the CPU 13 performs the maximum Q action processing (see FIG. 11) to retrieve the most effective (maximum Q action value maxQ) advice type "action" from the value function table "value" [achieve][change][i] while forwarding the action number search pointer I, in the state specified by the achievement level rank "achieve" and the achievement level rank change "change". Then, the CPU 13 proceeds to Step SJ5 and performs the advice of the type specified by the advice type "action" and ends the advice processing. Note that "performs the advice" herein indicates that the CPU 13, for example, notifies the user by displaying the advice specified by the advice type "action" on a screen or by synthesizing the audio of its words.

As described above, in the first embodiment, the CPU 13 identifies musical notation data in song data serving as a model (model performance) to which music playing data generated by the song being played and inputted by the user corresponds; determines whether the musical notation data is played by the right hand, the left hand, or both hands; judges whether or not the note of the musical notation data has been correctly played by comparing the pitch iPit of the identified musical notation data with the pitch of the music playing data; and set the clear flag iClear of the correctly played musical notation data to "1".

Subsequently, the CPU 13 extracts the number of occurrences and the number of times cleared (the number of times the musical notation data is correctly played) for each type of musical performance technique from the musical performance technique type iTech included in all musical notation data in the song data; calculates an achievement level for each type of musical performance technique by multiplying an accuracy rate (number of times cleared/number of occurrences) for each type of musical performance technique acquired from the extracted number of occurrences and the extracted number of times cleared by a difficulty level according to the type of musical performance technique; accumulates each calculated achievement level; and thereby acquires an achievement level achieveValue based on the difficulty level of the song.

Then, the CPU 13 updates state variables (achievement level rank "achieve" and achievement level rank change "change") in the value function table "value" based on the acquired achievement level achieveValue, and provides the user playing and inputting the song with advice of a type specified by the most effective (maximum Q action value maxQ) advice type "action" retrieved from the value function table "value" [achieve][change][action] based on the updated state variables. Therefore, optimal advice based on a user state can be given.

In addition, the first embodiment uses DP matching to identify musical notation data in song data serving as a model (model performance) to which music playing data generated by the song being played and inputted by the user corresponds, and to determine whether the musical notation data is played by the right hand, the left hand, or both hands. Therefore, regardless of which sound in song data is played, musical notation data corresponding music playing data can be identified.

Second Embodiment

Figure 15:
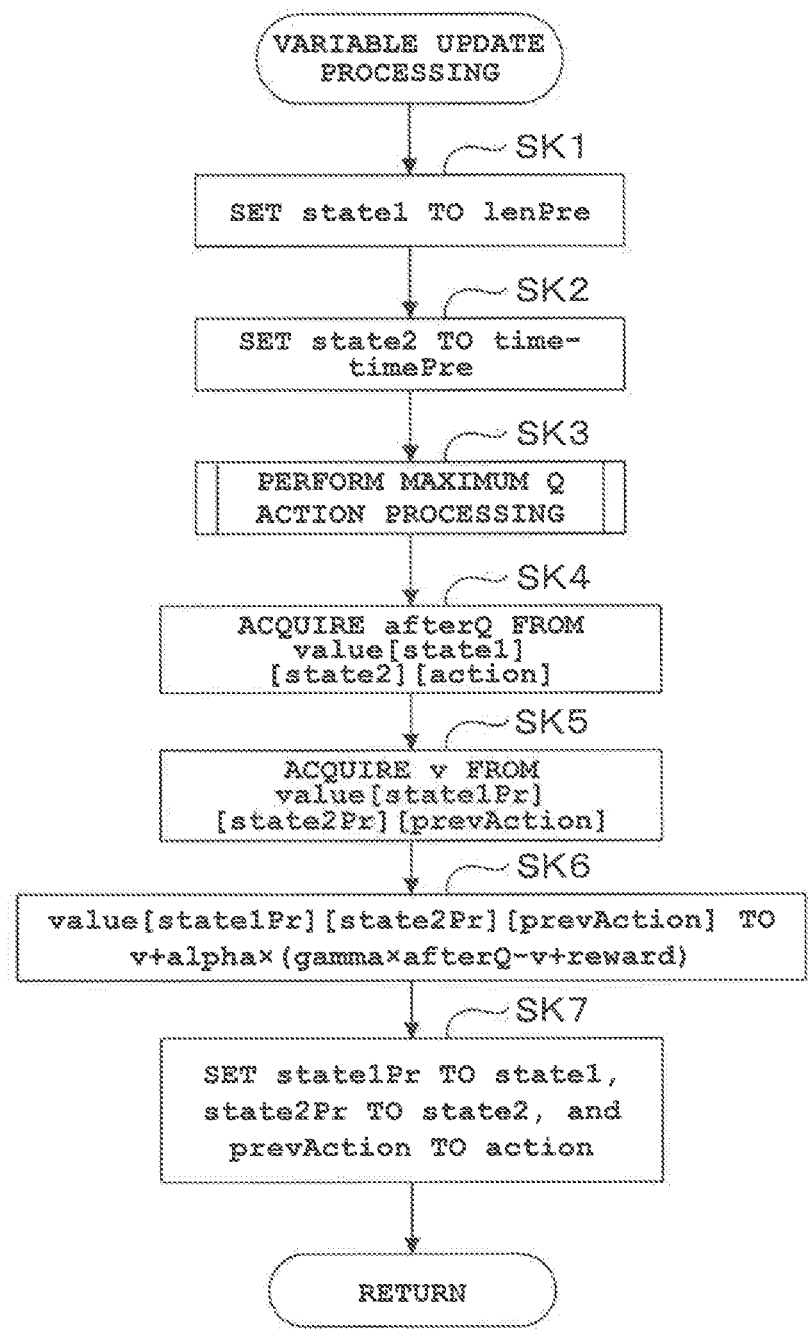
FIG. 15 is a flowchart of operations in variable update processing according to the second embodiment.
Figure 16:
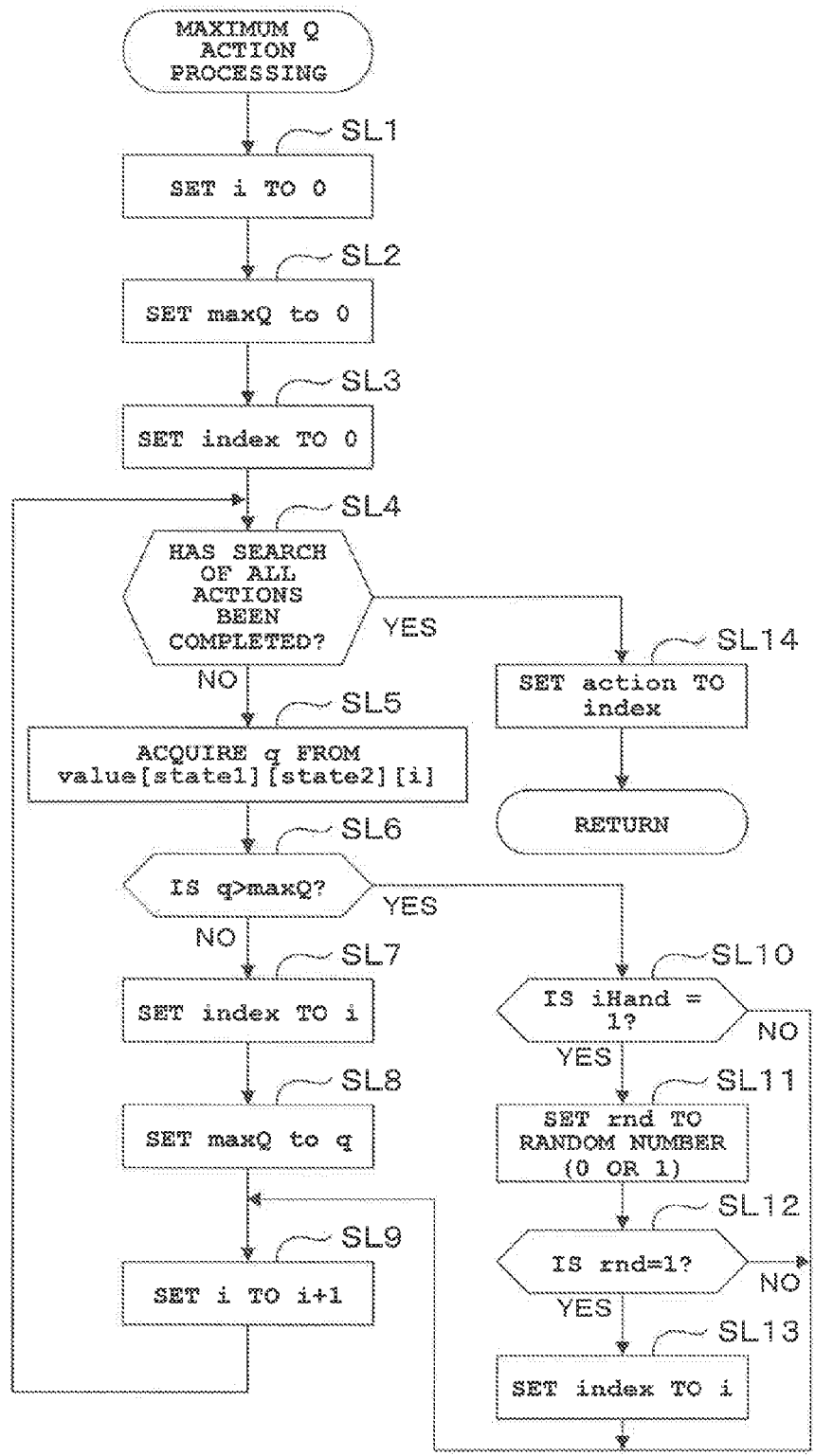
FIG. 16 is a flowchart of operations in maximum Q action processing according to the second embodiment.

Next, a second embodiment will be described with reference to FIG. 14 to FIG. 16. Note that the structure of the second embodiment is the same as that of the first embodiment, and therefore explanation thereof is omitted. The second embodiment differs from the first embodiment in that advice that is most effective (maximum Q action value maxQ) for enhancing desire to practice and extending practice time is given to the user in the second embodiment whereas advice that is most effective (maximum Q action value maxQ) for improving the achievement level achieveValue is given to the user in the first embodiment.

Figure 14:
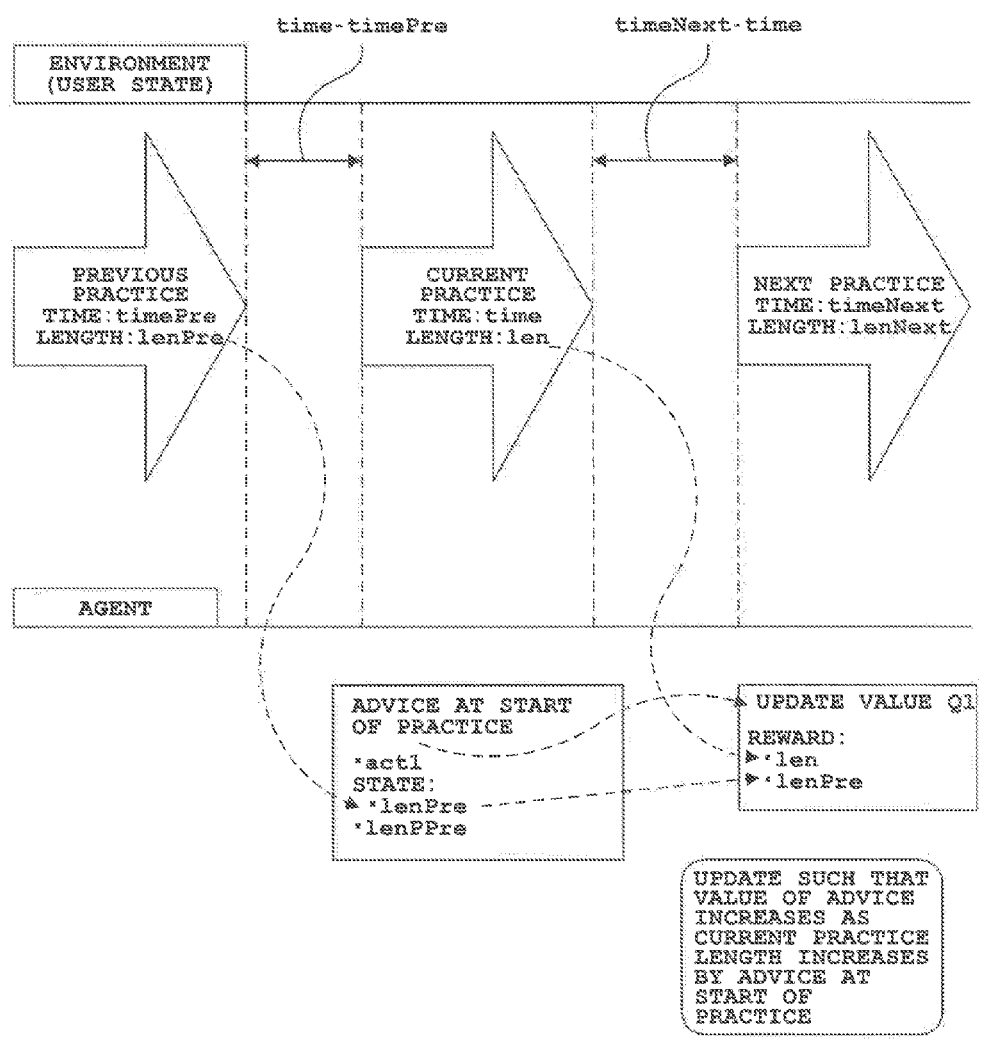
FIG. 14 is a diagram outlining a second embodiment.

That is, in the second embodiment, a state variable state1 (previous practice length lenpre) and a state variable state2 (practice interval time−timePre) in the value function table "value" are updated based on a current practice length len as shown in FIG. 14, and the most effective (maximum Q action value maxQ) advice for extending the practice length, or in other words, enhancing the desire to practice is retrieved from the value function table "value" [state1][state2][action] based on the updated state variables.

Hereinafter, operations in the variable update processing and the maximum Q action processing according to the second embodiment will be described, respectively. Note that, in the musical performance input processing (Step SA3) of the second embodiment, the CPU 13 stores music playing data based on the playing and inputting of music, while recording the starting time and the ending time every time the music is played and inputted.

(1) Operations in the Variable Update Processing According to the Second Embodiment Operations in the variable update processing according to the second embodiment will be described with reference to FIG. 15. When the variable update processing is started at Step SA7 (see FIG. 2) of the main routine as in the case of the first embodiment, the CPU 13 proceeds to Step SK1 shown in FIG. 15 and stores the previous practice length lenPre in a register state1 (hereinafter referred to as a state variable state1). Subsequently, at Step SK1, the CPU 13 stores a practice interval determined by subtracting the previous ending time timePre from the current starting time "time" in a register state2 (hereinafter referred to as a state variable state2).

Then, at Step SK3, the CPU 13 performs the maximum 0 action processing for retrieving the most effective (maximum 0 action value maxQ) advice type "action" from the value function table "value" [state1][state2][i] while forwarding the action number search pointer I, in a state specified by the state variable state1 and the state variable state2.

Next, at Step SK4, the CPU 13 acquires the current value afterQ of the advice type "action" in the current state specified by the state variable state1 and the state variable state2, from the value function table "value" [state1][state2][action]. Next, at Step SK5, the CPU 13 acquires the previous value "v" of the previous advice type prevAction in a previous state specified by a previous state variable state1Pr and a previous state variable state1Pr, from the value function table "value" [state1Pr][state2Pr][prevAction]

Next, at Step SK6, the CPU 13 updates the previous state and the previous value "v" based on the current value afterQ, in accordance with the following formula (2)

$$\text{value}[state1Pr][state1Pr][prevAction]-v+alpha \times (gamma \times afterQ-v+reward) \quad (2)$$

Note that, in the above-described formula (3), alpha is a learning rate, gamma is a reduction rate, and reward is a reward (practice length len)

Then, at Step SK7, the CPU 13 updates the previous state variable state1Pr, the previous state variable state2Pr, and the previous advice type prevAction with the current state variable state1, the current state variable state2, and the current advice type "action", respectively, and ends the variable update processing.

(2) Operations in the Maximum Q Action Processing According to the Second Embodiment Next, operations in the maximum Q action processing according to the second embodiment will be described with reference to FIG. 16. When the maximum Q action processing is started at Step SK3 (see FIG. 15) of the above-described variable update processing, the CPU 13 proceeds to Step SL1 shown in FIG. 16. At Step SL1 to Step SL3, the CPU 13 clears the action number search pointer i, the maximum Q action value maxQ, and the action type "index" to "0".

Then, at Step SL4, the CPU 13 judges whether or not search has been completed for all the actions. Then judged that the search has not been completed, the judgment result is "NO". Accordingly, the CPU 13 proceeds to Step SL5 and acquires the advice value q based on the action number search pointer i from the value function table "value" [state1][state2][i] in the state specified by the state variable state1 and the state variable state2.

Then, at Step SL6, the CPU 13 judges whether or not the advice value q read out from the value function table "value" [state1][state2][i] is greater than the maximum Q action value maxQ. At the initial pass, the maximum Q action value maxQ has been cleared and set to "0" at Step SL2. Therefore, the judgment result is "NO" and therefore the CPU 13 proceeds to Step SL7.

At Step SL7, the CPU 13 stores the action number search pointer i in the action type "index". Then, at subsequent Step SL8, the CPU 13 stores the advice value q read out from the value function table "value" [state1][state2][i] based on the action number search pointer I, as the maximum Q action value maxQ.

Next at Step SL9, the CPU 13 increments stepping of the action number search pointer i and returns to above-described Step SL4. Subsequently, the CPU 13 reads out the advice value q from the value function table "value" [state1][state2][i] based on the forwarding of the action number search pointer i. Then, when the read out advice value q exceeds the maximum Q action value maxQ, the judgment result at above-described Step SL6 is "YES" and therefore the CPU 13 proceeds to Step SL10.

At Step SL10 to Step SL13, to avoid monotony where the retrieved maximum Q action value maxQ is always the same, the CPU 13 adds an element that randomly changes. That is, at Step SL10, the CPU 13 judges whether or not the part specification data iHand is "1", or in other words whether or not the distance calculation has been performed on the left-hand part. When judged that the distance calculation has been performed on the right-hand part, the judgment result is "NO". Accordingly, the CPU 13 proceeds to above-described Step SL9, and after forwarding the action number search pointer I, returns to above-described Step SL4. In this instance, the element that randomly changes is not added.

Conversely, when judged that the distance calculation has been performed on the left-hand part, the judgment result at above-described Step SL10 is "YES", and therefore the CPU 13 proceeds to Step SL11. At Step SL11, the CPU 13 generates a random number of either "0" or "1", and stores it in the register rnd. Next, at Step SL12, the CPU 13 judges whether or not the random number value in the register rnd is "1". When judged that the random number value in the register rnd is "0", the judgment result is "NO", and therefore the CPU 13 proceeds to above-described Step SL9. On the other hand, when judged that the random number value in the register rnd is "1", the judgment result is "YES", and therefore the CPU 13 proceeds to Step SL13. At Step SL13, the CPU 13 sets the action number search pointer in the advice type "index", and then proceeds to above-described Step SL9. As a result, the element that randomly changes is added.

When the CPU 13 completes the search of all the actions (advice types) from the value function table "value" [state1][state2][i] based on the forwarding of the action number search pointer i while adding the element that randomly changes, the judgment result at above-described Step SL4 is "YES". Accordingly, the CPU 13 sets the action type 'index' specifying the advice value q that has become the maximum Q action value maxQ in the advice type "action" and ends the maximum Q action processing.

As described above, in the second embodiment, the CPU 13 updates the state variable state1 (previous practice length lenPre) and the state variable state2 (practice interval time-timePre) in the value function table "value" based an the current practice length len, and provides the user playing and inputting the song with advice of a type specified by the most effective (maximum Q action value maxQ) advice type "action" for extending practice length, or in other words, enhancing desire to practice which has been retrieved from the value function table "value" [state1][state2][action] based on the updated state variables. Therefore, optimal advice based on a user state can be given.

Figure 17:
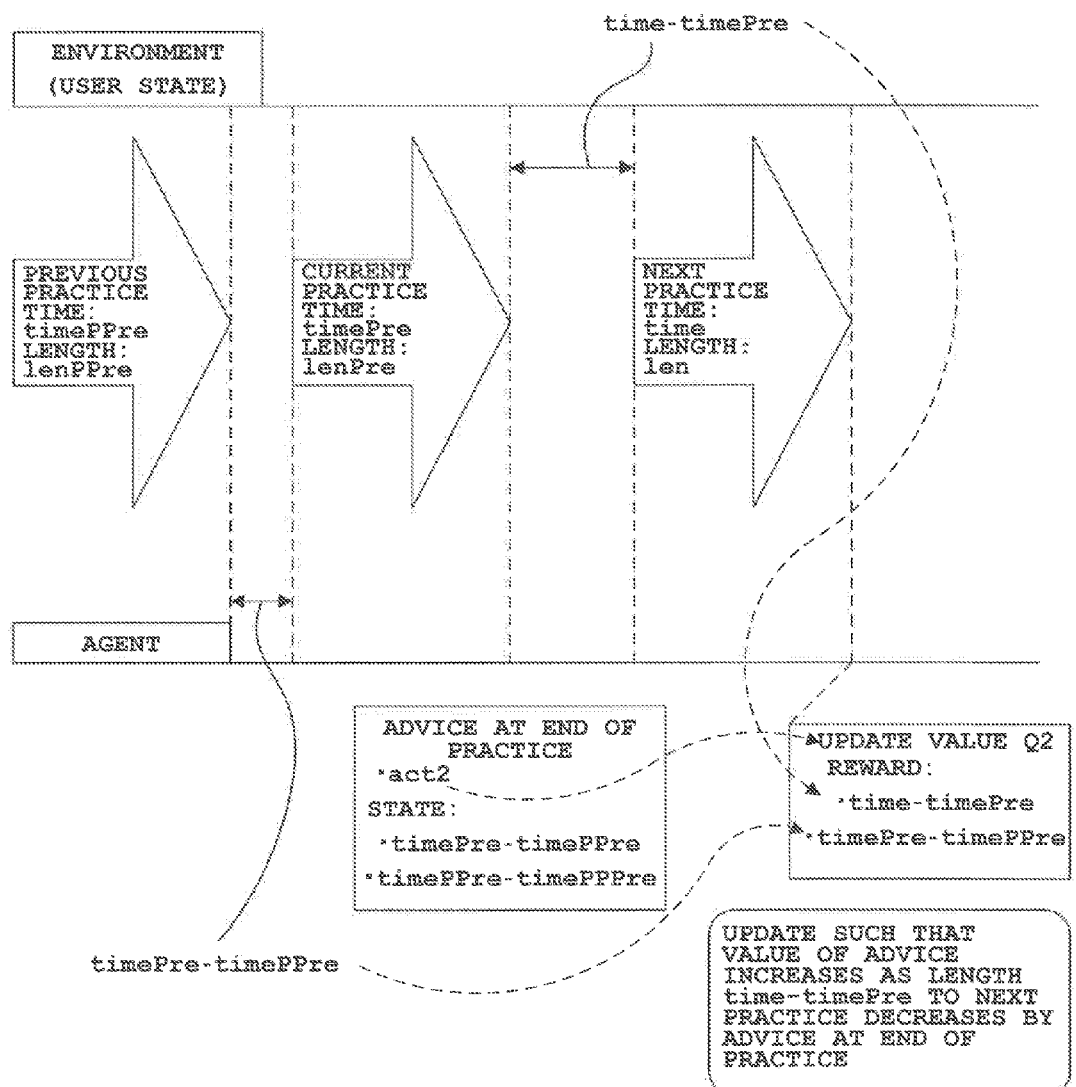
FIG. 17 is a diagram for explaining a variation example of the second embodiment.

In the configuration of the above-described second embodiment, advice effective for enhancing the user's desire to practice and extending the practice length is given. However, the present invention is not limited thereto, and a configuration may be adopted in which advice is given that is effective for enhancing the user's desire to practice and increasing the practice frequency by shortening the practice interval time-timePre as shown in the example in FIG. 17. In this configuration as well, optimal advice based on a user state can be given.

While the present invention has been described with reference to the preferred embodiments, it is intended that the invention be not limited by any of the details of the description therein but includes all the embodiments which fall within the scope of the appended claims.

What is claimed is:

1. A musical performance training device comprising:
an advice generating section which generates advice;
an acquiring section which acquires an achievement level of music performance based on music playing data acquired by a predetermined song being played, after the advice generating section generates the advice;
a calculating section which calculates an achievement level change amount based on the achievement level acquired by the acquiring section and a previously acquired achievement level acquired before the achievement level;
a storage control section which stores in a predetermined memory a data group where the previously acquired achievement level, the achievement level change amount and the advice are formed into a single group; and
an advice control section which selects advice data included in a data group having an achievement level closest to the achievement level acquired by the acquiring section and a greatest achievement level change amount from plural groups of data stored in the memory, and controls the advice generating section to generate advice based on the advice data.

2. The musical performance training device according to claim 1, wherein the acquiring section evaluates playing skills of a user based on a comparison of a plurality of musical notation data expressing each musical note composing the predetermined song and the music playing data generated in response to the predetermined song being played and inputted by the user, and acquires the achievement level based on a difficulty level of the predetermined song.

3. The musical performance training device according to claim 1, wherein the advice control section selects an advice type having a maximum value from among a plurality of advice types registered in a value function table, in a state specified by the achievement level acquired by the acquiring section and the achievement level change amount calculated by the calculating section.

4. The musical performance training device according to claim 1, further comprising a time recording section which records a starting time and an ending time each time the predetermined song is played,
wherein the acquiring section comprises a first acquiring section which acquires a previous practice length from a previous starting time and a previous ending time recorded by the time recording section, and a second acquiring section which acquires a practice interval from a current starting time and the previous ending time recorded by the time recording section; and
wherein the advice control section selects an advice type that is most effective for increasing a practice length from among a plurality of advice types registered in a value function table, in a state specified by the previous practice length acquired by the first acquiring section and the practice interval acquired by the second acquiring section.

5. The musical performance training device according to claim 4, wherein the advice control section selects an advice type that is most effective for shortening a practice interval and increasing practice frequency from among the plurality of advice types registered in the value function table, in the state specified by the previous practice length acquired by the first acquiring section and the practice interval acquired by the second acquiring section.

6. The musical performance training device according to claim 1, wherein the advice control section comprises a state variable generating section which generates a first state variable and a second state variable from the achievement level acquired by the acquiring section, and an advice selecting section which selects an advice type having a maximum value from a value function table based on Q-learning theory, based on the first state variable and the second state variable generated by the state variable generating section.

7. A non-transitory computer-readable storage medium having stored thereon a program that is executable by a computer mounted in a musical performance training device, the program being executable by the computer to perform functions comprising:

advice generation processing for generating advice;

acquisition processing for acquiring an achievement level of music performance based on music playing data acquired by a predetermined song being played, after the advice is generated by the advice generation processing;

calculation processing for calculating an achievement level change amount based on the achievement level acquired by the acquisition processing and a previously acquired achievement level acquired before the achievement level;

storing processing for storing in a predetermined memory a data group where the previously acquired achievement level, the achievement level change amount and the advice are formed into a single group; and advice control processing for selecting advice data included in a data group having an achievement level closest to the achievement level acquired by the acquisition processing and a greatest achievement level change amount, from plural groups of data stored in the memory, and controlling to generate advice based on the advice data in the advice generation processing.

8. A musical performance training method performed by a computer mounted in a musical performance training device, the method comprising:

an advice generating step of generating advice;

an acquiring step of acquiring an achievement level of music performance based on music playing data acquired by a predetermined song being played using the musical performance training device, after the advice is generated in the advice generating step;

a calculating step of calculating an achievement level change amount based on the achievement level acquired in the acquiring step and a previously acquired achievement level acquired before the achievement level;

a storing step of storing in a predetermined memory a data group where the previously acquired achievement level, the achievement level change amount and the advice are formed into a single group; and an advice control step of selecting advice data included in a data group having an achievement level closest to the achievement level acquired in the acquiring step and a greatest achievement level change amount, from plural groups of data stored in the memory, and controlling to generate advice based on the advice data in the advice generating step.

* * * * *